(12) United States Patent
Washio

(10) Patent No.: US 8,195,681 B2
(45) Date of Patent: Jun. 5, 2012

(54) SEARCHING DEVICE, SEARCHING METHOD AND RECORDING MEDIUM

(75) Inventor: Nobuyuki Washio, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 429 days.

(21) Appl. No.: 12/574,270

(22) Filed: Oct. 6, 2009

(65) Prior Publication Data

US 2010/0100559 A1 Apr. 22, 2010

(30) Foreign Application Priority Data

Oct. 16, 2008 (JP) ................................. 2008-267856

(51) Int. Cl.
*G06F 17/30* (2006.01)
(52) U.S. Cl. ........................................ 707/759; 707/760
(58) Field of Classification Search .................. 707/759, 707/760

See application file for complete search history.

(56) References Cited

U.S. PATENT DOCUMENTS

| | | | |
|---|---|---|---|
| 6,708,150 B1* | 3/2004 | Hirayama et al. | 704/243 |
| 6,950,797 B1* | 9/2005 | Hirayama et al. | 704/246 |
| 7,085,435 B2* | 8/2006 | Takiguchi et al. | 382/294 |
| 7,107,213 B2* | 9/2006 | Oda et al. | 704/234 |
| 7,313,524 B1* | 12/2007 | Minamino | 704/270 |
| 7,672,846 B2* | 3/2010 | Washio et al. | 704/251 |
| 7,684,983 B2* | 3/2010 | Shikano et al. | 704/233 |
| 7,689,319 B2* | 3/2010 | Kanda et al. | 700/245 |

FOREIGN PATENT DOCUMENTS

| | | |
|---|---|---|
| JP | 2001-41764 | 2/2001 |
| JP | 2005-156290 | 6/2005 |
| JP | 2006-349427 | 12/2006 |

* cited by examiner

*Primary Examiner* — Kim Nguyen
(74) *Attorney, Agent, or Firm* — Staas & Halsey LLP

(57) ABSTRACT

A searching device includes a history storing unit storing a search target obtained by a search and a search date in a storage unit; a relevancy storing unit storing in the storage unit a previous searching keyword including a plurality of date-related words as well as the search target and an attribute of the search target in association with one another; a change unit changing the previous searching keyword, based on the search date stored in the storage unit and a date output from a clock unit; a reception unit receiving a previous searching keyword and the search target or attribute that are entered by voice; and an extraction unit extracting a search target corresponding to the previous searching keyword and the search target or attribute received by the reception unit, by referring to the previous searching keyword that is obtained after changing, the search target and the attribute.

19 Claims, 46 Drawing Sheets

JULY 2008

| SUN | MON | TUE | WED | THU | FRI | SAT |
|---|---|---|---|---|---|---|
| 6 | ⑦ SEARCH DATE | 8 | 9 | 10 | 11 | 12 ◄── 1581 |
| 13 | 14 | 15 | 16 | 17 | 18 | 19 |
| 20 | | | | | | |

1582

| PRESENT DATE | TIME PASSAGE INFORMATION | | |
|---|---|---|---|
| 7 | TODAY | THIS WEEK | THIS MONTH |
| 8 | YESTERDAY | THIS WEEK | THIS MONTH |
| 9 TO 12 | | THIS WEEK | THIS MONTH |
| 13 TO 19 | | LAST WEEK | THIS MONTH |
| 20 TO 31 | | | THIS MONTH |
| FROM AUGUST 1 | | | LAST MONTH |

FIG. 3

FACILITY DB 154

| FACILITY ID | FACILITY NAME | POSITIONAL INFORMATION | ATTRIBUTE | |
|---|---|---|---|---|
| | | | CATEGORY | |
| 001 | RESTAURANT A | ... | UDON RESTAURANT<UDON/SOBA <NOODLES<JAPANESE FOOD <RESTAURANT | ... |
| 002 | RESTAURANT B | ... | UDON RESTAURANT<UDON/SOBA <NOODLES<JAPANESE FOOD <RESTAURANT | ... |
| ... | ... | ... | ... | ... |

F I G. 4

HISTORY FILE 155

| SEARCH DATE | FACILITY ID | FACILITY NAME |
|---|---|---|
| 07/07/2008 | 001 | RESTAURANT A |
| 08/07/2008 | 003 | RESTAURANT C |

FIG. 5

DATE SEARCHING KEYWORD  156

| UNIT ID | DATE-RELATED WORD | DATE SEARCHING KEYWORD |
|---|---|---|
| 101 | TODAY | I WENT TODAY |
| | | I STOPPED BY TODAY |
| | | ⋮ |
| 102 | YESTERDAY | I WENT YESTERDAY |
| | | I STOPPED BY YESTERDAY |
| | | I WENT ONE DAY AGO |
| | | I STOPPED BY ONE DAY AGO |
| | | ⋮ |
| 103 | THIS WEEK | I WENT THIS WEEK |
| | | ⋮ |
| 104 | LAST WEEK | I WENT LAST WEEK |
| | | ⋮ |
| 105 | THIS MONTH | I WENT THIS MONTH |
| | | ⋮ |

FIG. 6

JULY 2008

| SUN | MON | TUE | WED | THU | FRI | SAT |
|---|---|---|---|---|---|---|
| 6 | ⑦ SEARCH DATE | 8 | 9 | 10 | 11 | 12 |
| 13 | 14 | 15 | 16 | 17 | 18 | 19 |
| 20 | | | | | | |

1581

| PRESENT DATE | TIME PASSAGE INFORMATION |
|---|---|
| 7 | TODAY THIS WEEK THIS MONTH |
| 8 | YESTERDAY THIS WEEK THIS MONTH |
| 9 TO 12 | THIS WEEK THIS MONTH |
| 13 TO 19 | LAST WEEK THIS MONTH |
| 20 TO 31 | THIS MONTH |
| FROM AUGUST 1 | LAST MONTH |

1582

F I G. 9A

DICTIONARY DB 157

| SEARCH ID | UNIT ID | FACILITY ID | FACILITY NAME | ATTRIBUTE CATEGORY |
|---|---|---|---|---|
| 0707001 | 101 (TODAY), 103 (THIS WEEK), 105 (THIS MONTH), | 001 | RESTAURANT A | UDON RESTAURANT<UDON/SOBA <NOODLES<JAPANESE FOOD <RESTAURANT |
| ... | ... | ... | ... | ... |

F I G. 9B

DICTIONARY DB 157

| SEARCH ID | UNIT ID | FACILITY ID | FACILITY NAME | ATTRIBUTE CATEGORY |
|---|---|---|---|---|
| 0707001 | 102 (YESTERDAY), 103 (THIS WEEK), 105 (THIS MONTH), | 001 | RESTAURANT A | UDON RESTAURANT<UDON/SOBA <NOODLES<JAPANESE FOOD <RESTAURANT |
| ... | ... | ... | ... | ... |

FIG. 13

DICTIONARY DB 157

| SEARCH ID | UNIT ID | FACILITY ID | FACILITY NAME | ATTRIBUTE CATEGORY | SEARCH DATE |
|---|---|---|---|---|---|
| 0701001 | 104 (LAST WEEK), 105 (THIS MONTH), | 001 | RESTAURANT A | UDON RESTAURANT ... | 01/07/2008 |
| 0702005 | 104 (LAST WEEK), 105 (THIS MONTH), | 005 | RESTAURANT E | PASTA RESTAURANT ... | 02/07/2008 |
| 0707001 | 102 (YESTERDAY), 103 (THIS WEEK), 105 (THIS MONTH), | 001 | RESTAURANT A | UDON RESTAURANT ... | 07/07/2008 |
| ... | ... | ... | ... | ... | ... |

FIG. 14

```
EXTRACTION RESULT "RESTAURANT I WENT THIS MONTH"
            THREE CANDIDATES WERE EXTRACTED

1. JULY 1    RESTAURANT A   UDON RESTAURANT
BUSINESS INFORMATION: FAMOUS UDON RESTAURANT    —126
                IN XX CITY…              | MAP DISPLAY |

2. JULY 5    RESTAURANT E   PASTA RESTAURANT
BUSINESS INFORMATION: CHEF XX'S RESTAURANT…    —126
                                         | MAP DISPLAY |

3. JULY 7    RESTAURANT A   UDON RESTAURANT
BUSINESS INFORMATION: FAMOUS UDON RESTAURANT    —126
                IN XX CITY…              | MAP DISPLAY |
                                              —127
                                         |   DELETE    |
```

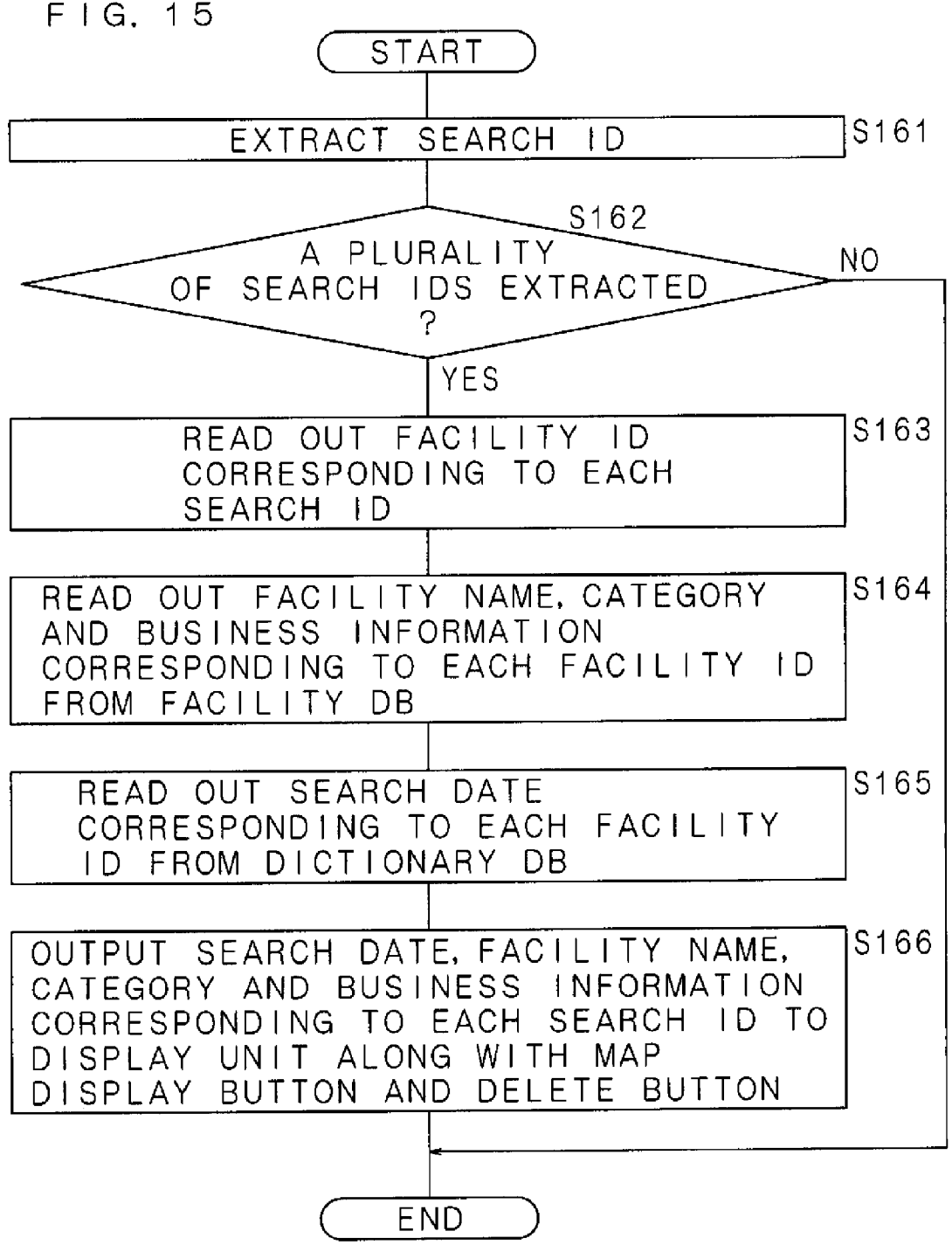

FIG. 17

RELEVANCY FILE  1510

| TIME PASSSAGE INFORMATION AND SEARCH DATE | EXPANDED TIME PASSAGE INFORMATION |
|---|---|
| THIS YEAR    JANUARY | LAST YEAR |
| LAST YEAR    DECEMBER | THIS YEAR |
| THIS MONTH   1 TO 5 | LAST MONTH |
| LAST MONTH   25 TO 31 | THIS MONTH |
| ⋮ | ⋮ |

F I G. 20

HISTORY FILE 155

| SEARCH DATE (ACQUISITION DATE) | FACILITY ID | FACILITY NAME | ACQUISITION DATE FLAG |
|---|---|---|---|
| 07/07/2008 | 001 | RESTAURANT A | |
| 08/07/2008 | 003 | RESTAURANT C | |
| 09/07/2008 | 005 | RESTAURANT E | ○ |
| ⋮ | ⋮ | ⋮ | ⋮ |

FIG. 22

FACILITY DB 154

| FACILITY ID | FACILITY NAME | POSITIONAL INFORMATION | ATTRIBUTE CATEGORY | LANDMARK |
|---|---|---|---|---|
| 001 | RESTAURANT A | ... | UDON RESTAURANT<UDON/SOBA <NOODLES<JAPANESE FOOD <RESTAURANT | F STATION |
| 002 | RESTAURANT B | ... | UDON RESTAURANT<UDON/SOBA <NOODLES<JAPANESE FOOD <RESTAURANT | G HOTEL |
| ... | ... | ... | ... | ... |
| 007 | F STATION | ... | STATION<PRIVATE RAILROAD <RAILROAD | H DEPARTMENT STORE |
| 008 | G HOTEL | ... | HOTEL <ACCOMMODATION FACILITY | D LAND |
| ... | ... | ... | ... | ... |

FIG. 23

DICTIONARY DB 157

| SEARCH ID | UNIT ID | FACILITY ID | FACILITY NAME |
|---|---|---|---|
| 0701001 | 104 (LAST WEEK) ... | 001 | RESTAURANT A |
| 0701002 | 104 (LAST WEEK) ... | 005 | RESTAURANT E |
| ... | ... | ... | ... |

| CATEGORY | ATTRIBUTE | | SEARCH DATE | ACQUISITION DATE FLAG |
|---|---|---|---|---|
| | NEIGHBORHOOD FACILITY ID | NEIGHBORHOOD FACILITY NAME | | |
| UDON RESTAURANT ... | 007 | F STATION | 01/07/2008 | |
| PASTA RESTAURANT ... | 008 | G HOTEL | 02/07/2008 | ○ |
| ... | ... | ... | ... | ... |

FIG. 26

DICTIONARY DB 157

| SEARCH ID | UNIT ID | NEIGHBORHOOD UNIT ID | FACILITY ID | FACILITY NAME |
|---|---|---|---|---|
| 0701001 | 104 (LAST WEEK)... | 1007 | 001 | RESTAURANT A |
| 0701002 | 104 (LAST WEEK)... | 1008 | 005 | RESTAURANT E |
| ... | ... | ... | ... | ... |

| ATTRIBUTE | | NEIGHBORHOOD FACILITY INFORMATION | | SEARCH DATE |
|---|---|---|---|---|
| CATEGORY | | NEIGHBORHOOD FACILITY ID | NEIGHBORHOOD FACILITY NAME | |
| UDON RESTAURANT | ... | 007 | F STATION | 01/07/2008 |
| PASTA RESTAURANT | ... | 008 | G HOTEL | 02/07/2008 |
| ... | | ... | ... | ... |

FIG. 28

NEIGHBORHOOD SEARCHING KEYWORD FILE 1511

| NEIGHBORHOOD UNIT ID | NEIGHBORHOOD FACILITY NAME | NEIGHBORHOOD SEARCHING KEYWORD |
|---|---|---|
| 1007 | F STATION | ALONG F STATION |
| | | IN FRONT OF F STATION |
| | | IN FRONT OF SUBWAY F STATION |
| | | ⋮ |
| 1008 | G HOTEL | ACROSS FROM G HOTEL |
| | | IN FRONT OF G HOTEL |
| | | IN FRONT OF HOTEL G |
| | | ⋮ |

FIG. 31

FACILITY DB  154

| FACILITY ID | FACILITY NAME | POSITIONAL INFORMATION | ATTRIBUTE CATEGORY | LANDMARK | ROAD INFORMATION |
|---|---|---|---|---|---|
| 001 | RESTAURANT A | ... | UDON RESTAURANT <UDON/SOBA•••   | F STATION | ROUTE 43 |
| 002 | RESTAURANT B | ... | UDON RESTAURANT <UDON/SOBA•••   | G HOTEL | EXPRESS HIGHWAY X |
| ... | ... | ... | ... | ... | ... |
| 007 | F STATION | ... | STATION <PRIVATE RAILROAD<RAILROAD | H DEPARTMENT STORE | ... |
| 008 | G HOTEL | ... | HOTEL <ACCOMMODATION FACILITY | D LAND | ... |
| ... | ... | ... | ... | ... | ... |

FIG. 32

DICTIONARY DB 157

| SEARCH ID | UNIT ID | ROAD UNIT | FACILITY ID | FACILITY NAME |
|---|---|---|---|---|
| 0701001 | 104 (LAST WEEK) .... | 1601 | 001 | RESTAURANT A |
| 0701002 | 104 (LAST WEEK) .... | 1602 | 005 | RESTAURANT E |
| ... | ... | ... | ... | ... |

| ATTRIBUTE | | ROAD INFORMATION | | SEARCH DATE |
|---|---|---|---|---|
| CATEGORY | | ROAD NAME | | |
| UDON RESTAURANT ... | | ROUTE 43 | | 01/07/2008 |
| PASTA RESTAURANT ... | | EXPRESS HIGHWAY X | | 02/07/2008 |
| ... | | ... | | ... |

F I G. 34

ROAD SEARCHING KEYWORD FILE  1512

| ROAD UNIT ID | ROAD NAME | ROAD SEARCHING KEYWORD |
|---|---|---|
| 1601 | ROUTE 43 | ALONG ROUTE 43 |
| | | IN FRONT OF NATIONAL ROUTE 43 |
| | | IN FRONT OF ROUTE 43 |
| | | ⋮ |
| 1602 | EXPRESS HIGHWAY X | ALONG EXPRESS HIGHWAY X |
| | | AT HIGHWAY X |
| | | ON HIGHWAY X |
| | | ⋮ |

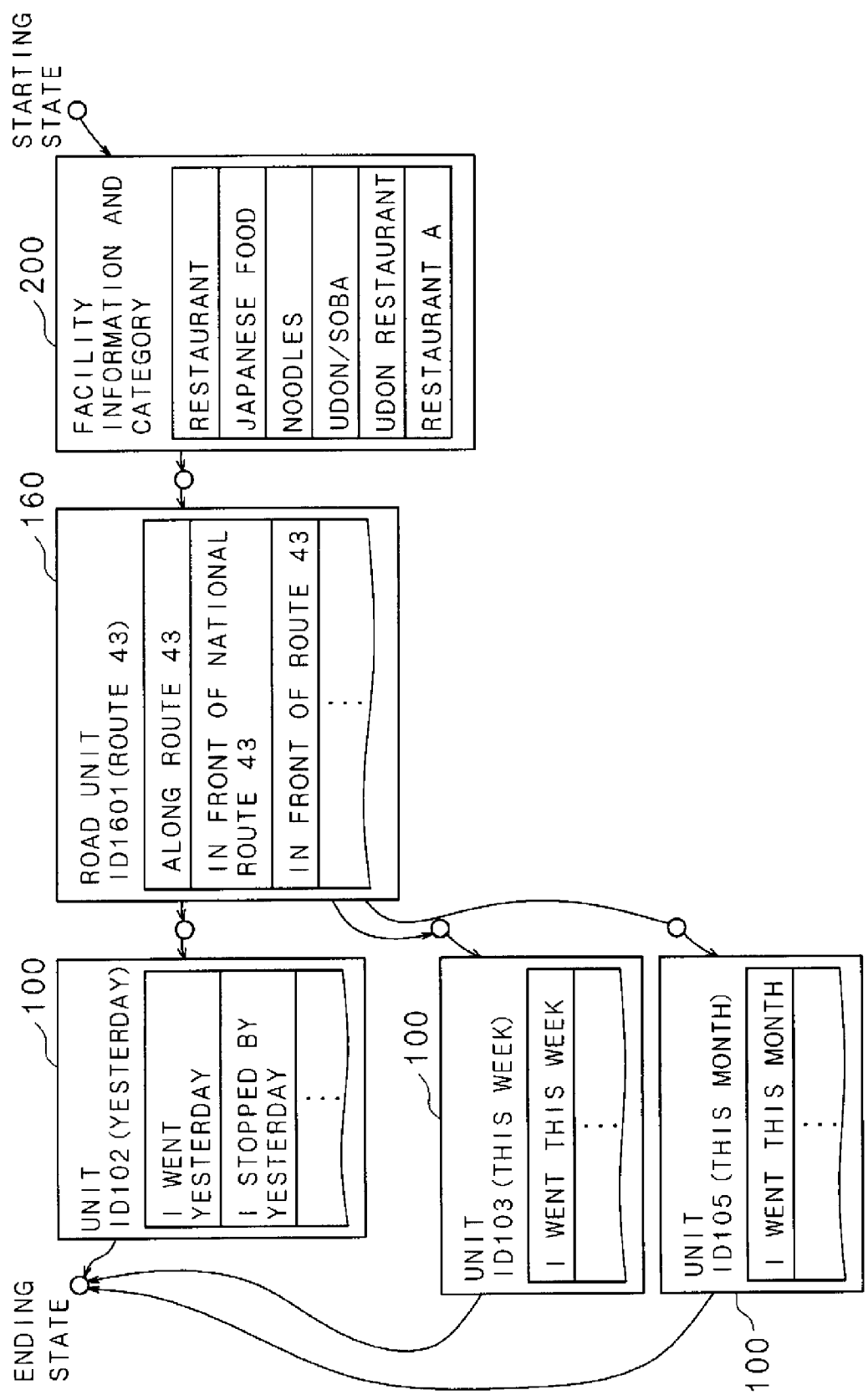

FIG. 37

DICTIONARY DB  157

| SEARCH ID | UNIT ID | FACILITY ID | FACILITY NAME | ATTRIBUTE CATEGORY |
|---|---|---|---|---|
| 0701001 | 104 (LAST WEEK)... | 001 | RESTAURANT A | UDON RESTAURANT... |
| 0701002 | 104 (LAST WEEK)... | 005 | RESTAURANT E | PASTA RESTAURANT... |
| ... | ... | ... | ... | ... |

| SEARCH DATE | ACQUISITION DATE FLAG | WEIGHT | EXTRACTION DATE |
|---|---|---|---|
| 01/07/2008 | | 0.5 | 01/07/2008 |
| 02/07/2008 | ○ | 0.3 | 02/07/2008 |
| ... | ... | ... | ... |

US 8,195,681 B2

SEARCHING DEVICE, SEARCHING METHOD AND RECORDING MEDIUM

CROSS-REFERENCE TO RELATED APPLICATIONS

This application is based upon and claims the benefit of priority of the prior Japanese Patent Application No. 2008-267856, filed on Oct. 16, 2008, the entire contents of which are incorporated herein by reference.

FIELD

The embodiments discussed herein relate to a searching device and a searching method for searching information, and a computer-readable recording medium storing a computer program for making a computer function as a searching device for searching information.

BACKGROUND

In recent years, a technology of searching for certain information among a large amount of information using a mobile phone, a car navigation device, a personal computer or a Web server computer has become widespread. When conducting a search, the user enters a keyword using a keyboard or a voice entry system. In the case of voice entry, a voice recognition process is performed. Though the voice recognition technology has been improved year by year in its accuracy, the recognition rate thereof still remains at a low level, causing a problem of inconvenience. To solve the problem, the vehicle-mounted voice recognition apparatus disclosed in Japanese Laid-Open Patent Publication No. 2006-349427 discusses a technology for storing travelling history of a vehicle and creating a voice recognition dictionary for each driver based on the stored travelling history.

SUMMARY

According to an aspect of the embodiments, a searching device includes a history storing unit storing information of a search target obtained by a search and a search date in a storage unit; a relevancy storing unit storing in the storage unit a previous searching keyword including a plurality of date-related words as well as the search target and an attribute of the search target in association with one another; a change unit changing the previous searching keyword stored in the storage unit, based on the search date stored in the storage unit and a date output from a clock unit; a reception unit receiving a previous searching keyword and the search target or the attribute that are entered by voice; and an extraction unit extracting a search target corresponding to the previous searching keyword and the search target or attribute received by the reception unit, by referring to the previous searching keyword that is obtained after changing by the change unit, the search target and the attribute that are stored in the storage.

The object and advantages of the invention will be realized and attained by the elements and combinations particularly pointed out in the claims. It is to be understood that both the foregoing general description and the following detailed description are exemplary and explanatory and are not restrictive of the embodiment, as claimed.

BRIEF DESCRIPTION OF DRAWINGS

FIG. 3 is an explanatory drawing illustrating an example of a record layout of a facility DB;

FIG. 4 is an explanatory drawing illustrating an example of a record layout of a history file;

FIG. 5 is an explanatory drawing illustrating an example of a record layout of a date searching keyword file;

FIG. 6 is an explanatory drawing illustrating an overview of a calendar file;

FIGS. 9A and 9B are explanatory drawings illustrating examples of record layouts of a dictionary DB;

FIG. 13 is an explanatory drawing illustrating an example of a record layout of a dictionary DB according to Embodiment 2;

FIG. 14 is an explanatory drawing illustrating an example of a display image of an extraction result according to Embodiment 2;

FIG. 15 is an operation chart illustrating an example of the procedure of an output process;

FIG. 17 is an explanatory drawing illustrating an example of a record layout of a relevancy file;

FIG. 20 is an explanatory drawing illustrating an example of a record layout of a history file according to Embodiment 4;

FIG. 22 is an explanatory drawing illustrating an example of a record layout of a facility DB according to Embodiment 5;

FIG. 23 is an explanatory drawing illustrating an example of a record layout of a dictionary DB according to Embodiment 5;

FIG. 26 is an explanatory drawing illustrating an example of a record layout of a dictionary DB according to Embodiment 6;

FIG. 28 is an explanatory drawing illustrating an example of a record layout of a neighborhood searching keyword file;

FIG. 31 is an explanatory drawing illustrating an example of a record layout of a facility DB according to Embodiment 7;

FIG. 32 is an explanatory drawing illustrating an example of a record layout of a dictionary DB according to Embodiment 7;

FIG. 34 is an explanatory drawing illustrating an example of a record layout of a road searching keyword file;

FIG. 35 is an explanatory drawing illustrating an example of a grammar generated one day later;

FIG. 37 is an explanatory drawing illustrating an example of a record layout of a dictionary DB according to Embodiment 8;

DESCRIPTION OF EMBODIMENTS

Embodiment 1

Figure 1:
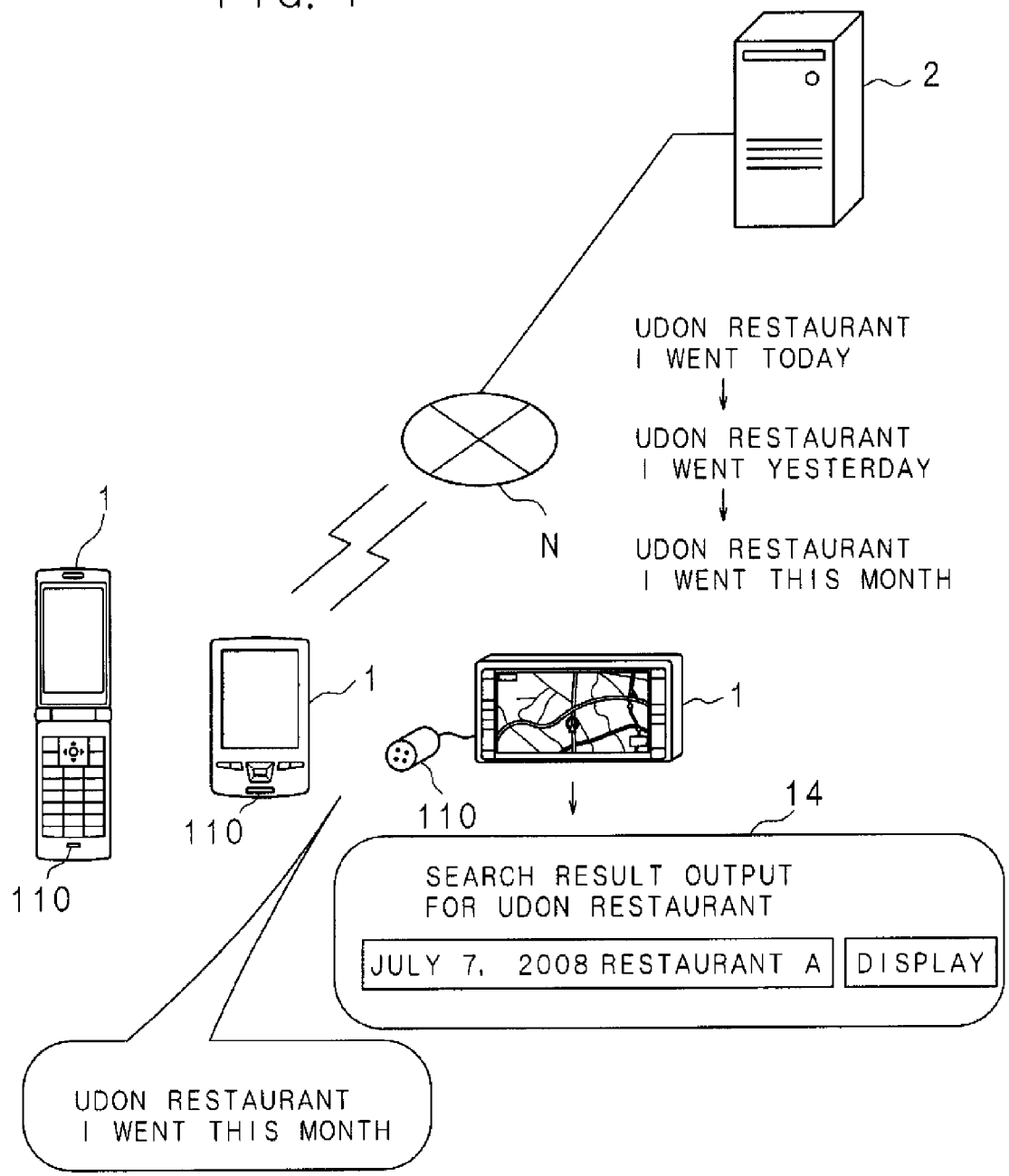
FIG. 1 is an explanatory drawing illustrating an overview of an information searching system.

FIG. 1 is an explanatory drawing illustrating an overview of an information searching system. In the present embodiment, facility information such as a station, a sightseeing area, a stadium, a restaurant, a residence, a hotel, a department store or the like that may be found by a search with a mobile phone, a car navigation device or the like is used as an example for a search target.

A searching device 1, 1, 1 . . . includes, for example, a navigation device mounted on a movable object such as a vehicle, a ship, a motorcycle or the like, a portable navigation device removable from a vehicle or the like, and a mobile terminal unit or the like. As a mobile terminal unit, a notebook personal computer, a mobile phone, a game machine, a Personal Digital Assistant (PDA), a smartphone, a music player or the like is used for example. In the case where the searching device 1 is, for example, a mobile phone, such a process as route search may be executed in cooperation with a server computer 2 connected to the mobile phone via a communication network N including Internet, a telephone line network and the like.

More specifically, a map database (hereinafter referred to as DB) and a road DB required for route search are stored in the server computer 2 due to their large volume, while the mobile phone sends information on a present location and a destination to the server computer 2. The server computer 2 performs route search and sends a result to the mobile phone along with map and road information. The other processes are executed on the mobile phone. If the mobile phone has a large memory capacity, it may store a map DB and a road DB so as to execute all processes on itself in the same way as the car navigation device. In the present embodiment, a car navigation device mounted on a vehicle is used as an example for the searching device 1. The searching device 1 is hereinafter referred to as a car navigation device 1.

Next, an overview of the present embodiment is described. The car navigation device 1 stores information on a facility searched for as a destination, a staging point or the like and a date of the search (hereinafter referred to as "search date") as a history. The car navigation device 1 creates, based on the search date, a grammar/language model (hereinafter simply referred to as a grammar) corresponding to a receivable text including a date-related word such as "this month," "last week" or the like, facility information and an attribute, i.e. category, of the facility information. Furthermore, the car navigation device 1 executes the process of changing the date-related word as a day passes. For example, assume that the user searched for an Udon noodle (noodles made of wheat flour) restaurant "A" on Monday, Jul. 7, 2008, and ate Udon there. In this case, the grammar "Udon restaurant I went today" concerning "Restaurant A" will be "Udon restaurant I went yesterday" after one day. Moreover, when several weeks pass in the same month, the grammar concerning "Restaurant A" will be "Udon restaurant I went this month."

The car navigation device 1 executes a voice recognition process based on the voice entered from a microphone 110. When searching, the user enters by voice a previous searching keyword (hereinafter referred to as a date searching keyword) including a verb such as "went" or "stopped by" and a date-related word such as "this month" or "last week." Along with the above, the user also enters by voice facility information such as the name of a restaurant, for example, "Restaurant A," or an attribute, i.e. category, for the facility information such as "Udon restaurant." Suppose that the user wishes to eat at the same Udon restaurant again on Friday, July 25 in the same year. In this case, though the user may have a vague memory, he/she enters "Udon restaurant I went this month" from the microphone 110.

The entered word "Udon restaurant I went this month" includes a category "Udon restaurant" and date-related words "this month." The car navigation device 1 compares the entered voice with the grammar in which the date-related words are changed as needed by the changing a process, to extract "Restaurant A" the user went on July 7. Then the car navigation device 1 outputs a result to a display unit 14. As such, by conducting a search based on a date and a location with the changing process for the date, the extraction process based on voice recognition may be improved in its accuracy compared to the case in which no date-related information is used. This will be described below in detail.

Figure 2:
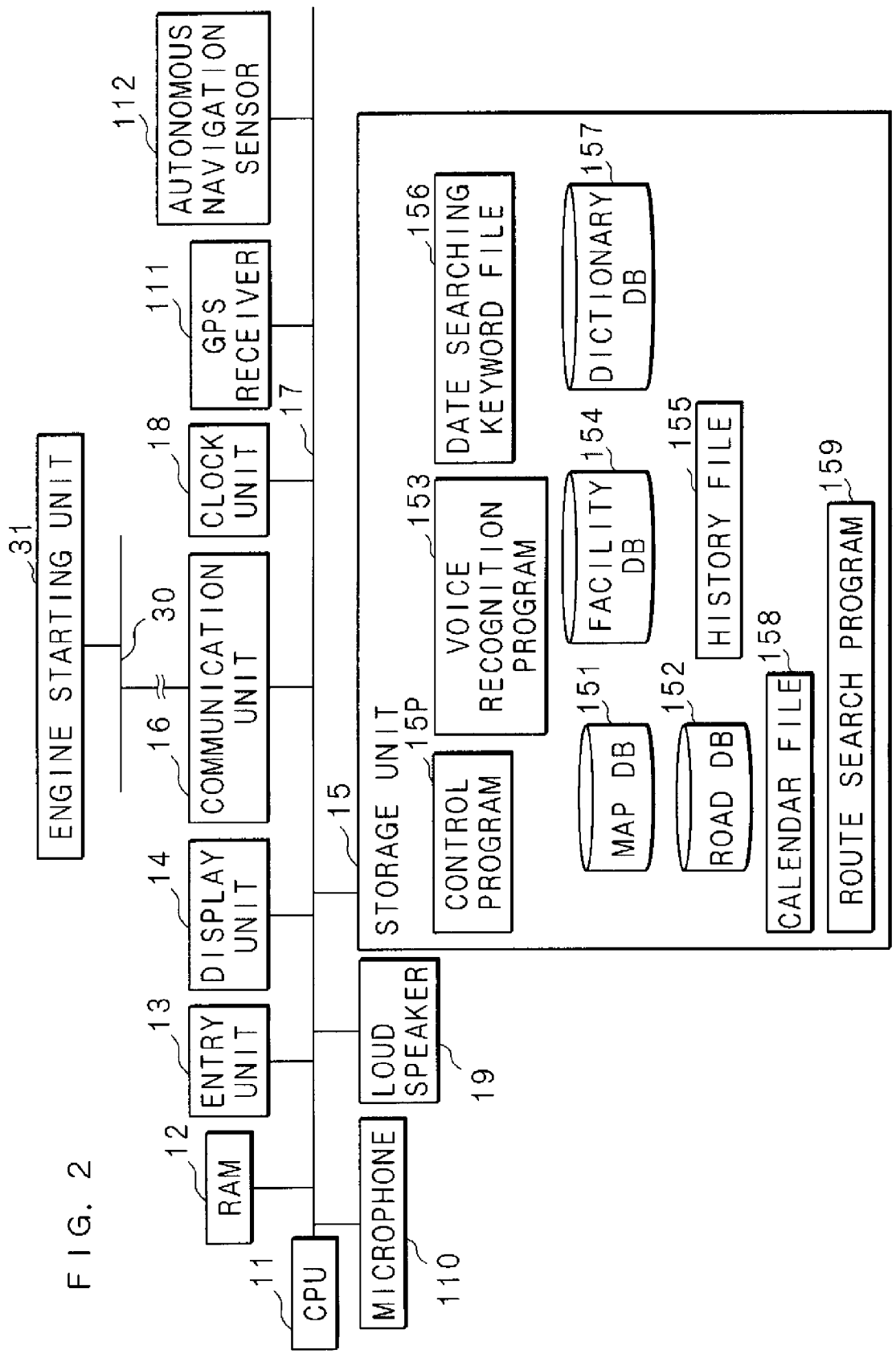
FIG. 2 is a block diagram illustrating an example of a hardware group of a car navigation device.

FIG. 2 is a block diagram illustrating an example of a hardware group of the car navigation device 1. The car navigation device 1 includes a Central Processing Unit (CPU) 11 as a control unit, a Random Access Memory (RAM) 12, an entry unit 13, a display unit 14, a storage unit 15, a communication unit 16 and a clock unit 18. Also, the car navigation device 1 includes a loud speaker 19, a microphone 110, a Global Positioning System (GPS) receiver 111, an autonomous navigation sensor 112 and the like. The CPU 11 is connected to each of the hardware units via a bus 17 to control the hardware units and to execute various software functions according to a control program 15P stored in the storage unit 15.

The display unit 14 is, for example, a liquid crystal display, an organic Electro-Luminescence (EL) display or the like, which displays various kinds of information such as a map, a road, a facility and the like. The entry unit 13 is a push button or the like. The entry unit 13 may be layered on the display unit 14 like a touch panel. In the description below, a touch panel is used as an example. The loud speaker 19 amplifies and outputs a voice signal for voice data output when facility information is guided. The microphone 110 converts the externally entered voice signal to an electric analog signal. The electric analog signal after conversion is further converted to digital signal data by an A/D (analog to digital) converter (not illustrated) to be output to the CPU 11. The communication unit 16 is a Controller Area Network (CAN) controller connected to a CAN bus 30 to execute transmission and reception of information between the communication unit 16 and the other devices mounted on a vehicle in accordance with a CAN protocol. It is understood that a protocol other than the CAN protocol may also be employed.

An engine starting unit 31 outputs an engine starting signal to the CAN bus 30 when, for example, the user turns on an ignition switch of a user's car. The communication unit 16 receives the engine starting signal and outputs it to the CPU 11. The clock unit 18 outputs date and time information to the CPU 11. In the present embodiment, though an example is described wherein the clock unit 18 mainly outputs date information to facilitate explanation, the clock unit 18 may also output hour, minute and second information as well as the date information. The GPS receiver 111 receives an electric wave from an artificial satellite, i.e. GPS satellites, to find the present position and the present orientation. The found positional information includes data about the latitude, the longitude and the altitude of a vehicle. The autonomous navigation sensor 112 includes a speed sensor detecting a traveled distance of a vehicle and an angle sensor detecting a rotated angle of a vehicle. The output signals from the GPS receiver 111 and the autonomous navigation sensor 112 are supplied to the CPU 11, which calculates the present position and orientation of the vehicle based on the output signals.

The storage unit 15 which is, for example, a hard disk, a very large memory or the like, stores therein the control program 15P, a map DB 151, a road DB 152, a voice recognition program 153, a facility DB 154, a history file 155 and a date searching keyword file 156. Moreover, the storage unit 15 also stores therein, for example, a dictionary DB 157, a calendar file 158, a route search program 159 and the like. The CPU 11 executes the processing such as storage or retrieval of necessary information, by dialog using Structured Query Language (SQL) or the like in a scheme associated with a key of a field in each DB.

The voice recognition program 153 recognizes the voice data entered from the microphone 110 to output a recognition result. Specifically, the CPU 11 extracts feature quantity from the voice data and then executes a matching process using a given acoustic model, e.g. a hidden Markov model representing the acoustic feature of a phoneme, and a given language model, e.g. an N-gram probabilistic model representing bias in N word lines, a regular grammar or the like. More specifically, the CPU 11 serially executes acoustic matching between a feature vector sequence extracted from the voice data and a word, a grammar and the like stored in the dictionary DB 157 using the acoustic model and the language model. If a recognition candidate is decided by the matching process, the candidate is output as a recognition result. In the dictionary DB 157, a grammar generated at the process described in the present embodiment is stored in addition to the word used for the voice recognition process. The generated grammar may be stored somewhere other than the dictionary DB 157.

Stored in the map DB 151 is drawing data for drawing a facility, a road and the like on a map. The road DB 152 stores therein information related to a link indicating a road as road information and a node such as an intersection or the like which connects links to each other. Specifically, stored in the road DB 152 are a link, a node and an ID for identifying the link and the node, as well as positional information, a road width, a distance, a road type, driving lane information and the like as an attribute. The facility DB 154 stores therein facility information related to facilities such as, for example, a restaurant, a hospital, a department store, a rest area, a sightseeing area, a station, a park, a private residence and the like.

FIG. 3 is an explanatory drawing illustrating an example of a record layout of the facility DB 154. The facility DB 154 includes a facility ID field, a facility name field, a positional information field, an attribute field and the like. In the facility ID field, a facility ID which is specific identification information for specifying a facility is stored. In the facility name field, a facility name which is facility information associated with a facility ID is stored. In the positional information field, positional information including the latitude, the longitude and the like of a facility is stored. In the attribute field, a category of a facility is stored as an attribute of a facility. For example, "Restaurant A" belongs to a category of "Udon restaurant," while "Udon restaurant" belongs to a higher category of "Udon/Soba (noodles made of buckwheat)."

The category of "Udon/Soba" belongs to a higher category of "noodles," which belongs to a higher category of "Japanese food," which further belongs to a higher category of "restaurant." The facility DB 154 stores therein basic facility information, such as a facility name and a facility ID, as well as other information related to a facility, such as an address, a phone number, business information, a rating (a facility rating) and the like of a facility. The data layouts and examples thereof discussed herein are mere examples, and the present embodiment is not limited thereto. Data may be placed freely depending on a design as long as the relationship between data described above is maintained.

A route search program 159 is a program for finding a route from a present location to a destination. The CPU 11 refers to the map DB 151, the road DB 152 and the facility DB 154 to find a plurality of routes to a destination using Dijkstra's algorithm or the like in accordance with the route search program 159. In the route search, the CPU 11 calculates the cost for each route in consideration of an attribute and a connection status of a road, as well as time required, a distance required, a link and the like for each road. The CPU 11 then decides the least expensive route as a recommended route. The CPU 11 reads out map information needed for driving on the recommended route from the map DB 151 to display it on the display unit 14.

When the route search is performed, facility information of a destination is searched for. The search for facility information is executed based on search conditions based on a phone number entry, an address entry, a character entry of a facility name, an entry of a facility on a map displayed on the display unit 14 using the entry unit 13, an entry of a category such as a restaurant, an Udon restaurant or the like. The CPU 11 receives a search condition entered from the entry unit 13, refers to the facility DB 154, the map DB 151 and the road DB 152, and then outputs facility information as a search result on the display unit 14. The CPU 11 stores the facility information, i.e. a search target, which are obtained by the search, and a search date in the history file 155.

FIG. 4 is an explanatory drawing illustrating an example of a record layout of the history file 155. The history file 155 includes a search date field, a facility ID field and a facility name field. The CPU 11 stores a facility ID, which is facility information obtained by a search, in the facility ID field, while it stores a facility name corresponding to the facility ID in the facility name field. Moreover, the CPU 11 stores a search date in the search date field with reference to a date output from the clock unit 18. In the example illustrated in FIG. 4, the user searched for an Udon restaurant "Restaurant A (facility ID '001')" on Jul. 7, 2008. The CPU 11 sequentially stores facility information and a search date in the history file 155 every time a search result is obtained.

FIG. 5 is an explanatory drawing illustrating an example of a record layout of the date searching keyword file 156. The date searching keyword file 156 stores therein a plurality of types of date searching keywords including a date-related word. For the date-related word, a noun for specifying a date of search at present or past is used such as today, yesterday, the day before yesterday, this week, last week, two weeks ago, this month, last month, this year, last year, two years ago or the like for example. In the present embodiment, an example is described wherein today, yesterday, this week, last week, and this month are used for the date-related word, to facilitate explanation. The date searching keyword, which is used in searching facility information, is a term including a date-related word.

In addition to the date-related word described above, the date searching keyword may include a subject, a verb or the like. The subject includes, for example, "I", "we" or the like. The verb includes, for example, the past tense of verbs such as "went," "stopped by," "ate," "checked," "searched for" and the like. In the present embodiment, description is made by illustrating an example wherein the subject "I" is used as well as the past tense of verbs "went" and "stopped by." The date searching keyword file 156 includes a unit ID field, a date-related word field and a date searching keyword field. The unit ID field stores therein an ID for identifying a date-related word and a plurality of date searching keywords corresponding thereto.

Words related to present and past dates such as "today" and "yesterday" are stored in the date-related word field. A plurality of candidates for the date searching words are stored. For example, associated with the date-related word "today" of ID "101," the words such as "I went today," "I stopped by today" and the like are stored.

FIG. 6 is an explanatory drawing illustrating an overview of the calendar file 158. Stored in the calendar file 158 are a calendar and a rule used when the CPU 11 outputs time passage information corresponding to an elapsed time, i.e. days, months or years, from a search date, based on a search date read out from the history file 155 and date information output from the clock unit 18. The time passage information corresponds to a day or days passed from a search date, which is decided based on a search date and a date output from the clock unit 18. Specifically, the time passage information is a plurality of date-related words obtained, according to a rule, based on a search date, the number of days passed from the search date and a calendar. The time passage information, corresponding to the above-described date-related word, includes, for example, today, yesterday, the day before yesterday, this week, last week, two weeks ago, this month, last month, this year, last year, two years ago and the like.

The calendar file 158 stores therein a calendar 1581 and a rule file 1582. In FIG. 6, a part of July 2008 is represented for example as the calendar 1581, while Monday of the second week is illustrated for an example of the rule file 1582. Assume that the search date is Monday, Jul. 7, 2008. If today is the search date, the CPU 11 outputs today as well as this week and this month, since the number of days passed is zero which means the same day, the same week and the same month. On Wednesday July 8, the number of days passed is one, which means the same week and same month, so that yesterday, this week and this month are output as time passage information. From 9 to 12, the number of days passed are two to five, which are in the same week and the same month, so that this week and this month are output from the rule file 1582.

If the search date is one of the days from 13 to 19 that are already in the next week, the time passage information will be the last week and this month. Likewise, because the days from 20 to 31 which is the last day of the month are in the same month as the search date, the time passage information will be "this month". Furthermore, after August 1st, the passage information will be "last month" since the date is already in the next month. The calendar file 158 is provided with the rule file 1582 in which a rule of time passage information is stored for each day depending on the number of days passed from a search date, in case that the search date is Saturday, the last day of the month or the like.

Figure 7:
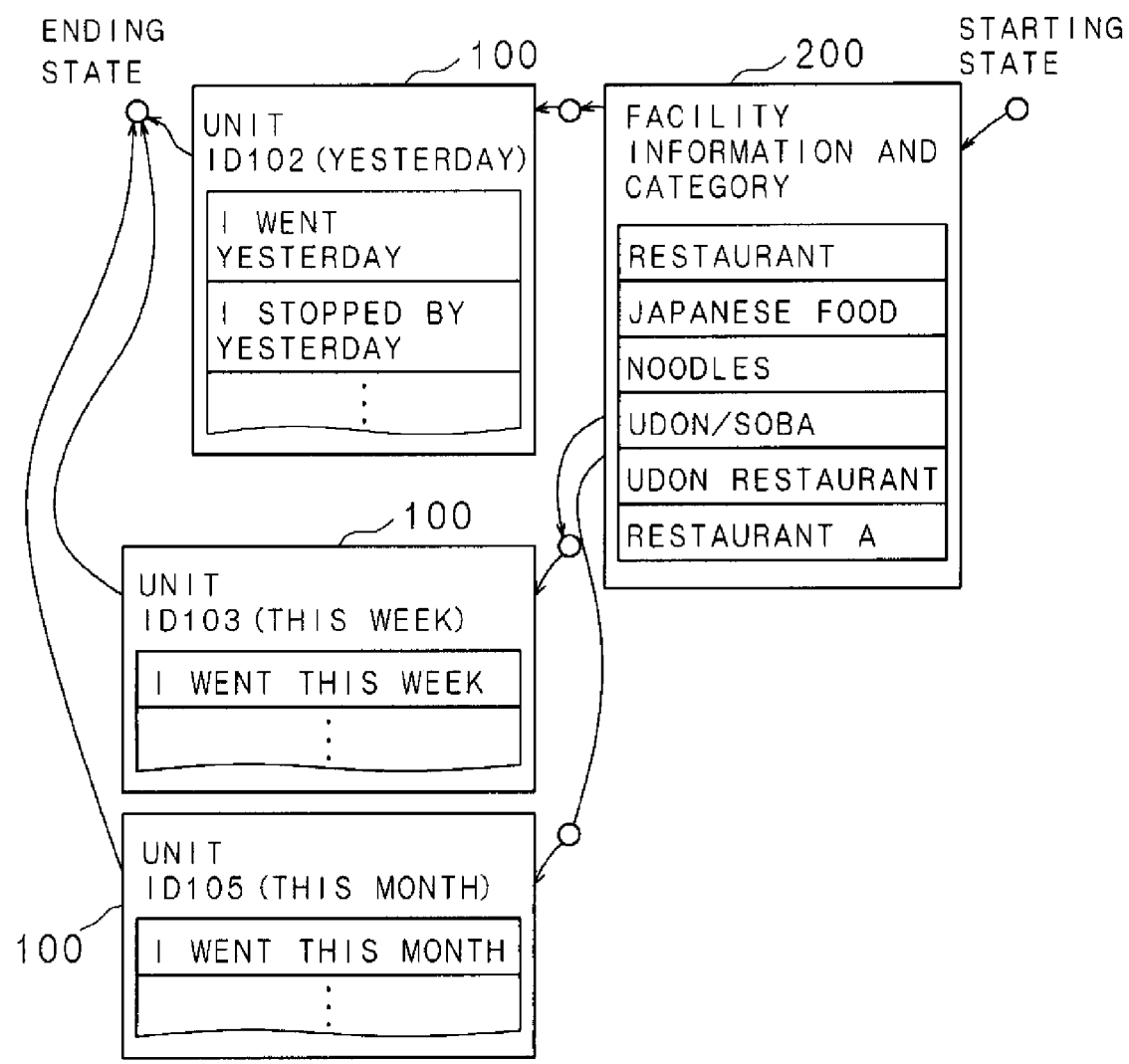
FIG. 7 is an explanatory drawing illustrating an example of a grammar generated one day later.

Next, an algorithm for a grammar creating process is described. FIG. 7 is an explanatory drawing illustrating an example of a grammar generated one day later. Assume that the user searched for and ate at an Udon restaurant "Restaurant A" on July 7. On July 8, the day the user went to the restaurant becomes yesterday, this week or this month. The CPU 11 refers to the calendar file 158 described above to output the time passage information of yesterday, this week and this month. The CPU 11 extracts a date searching keyword corresponding to the output time passage information from the date searching keyword file 156 as a date unit 100. Hereinafter, a group including a plurality of date searching keywords stored in association with time passage information such as "today" or the like will be suitably referred to as the date unit 100. In the example illustrated in FIG. 7, the date unit 100, 100, 100 including a plurality of date searching keywords corresponding to a unit ID 102 "yesterday," a unit ID 103 "this week" and a unit ID 105 "this month" are read out.

The CPU 11 outputs from the facility DB 154 a facility unit 200 including a facility name "Restaurant A" which is facility information and categories such as "Udon restaurant," "restaurant" and the like. Hereinafter, a group including facility information and a plurality of categories will suitably be referred to as the facility unit 200. In the process of voice recognition, the CPU 11 determines that the voice recognition is a success when a route from a starting status to an ending status is established, extracting the corresponding facility information "Restaurant A." In the example of FIG. 7, connection is made among all the routes illustrated by arrows from the stating status to the ending status. Hence, the CPU 11 is able to extract "Restaurant A" the user went on July 7, when "restaurant" and "I went yesterday" were voice-recognized.

Figure 8:
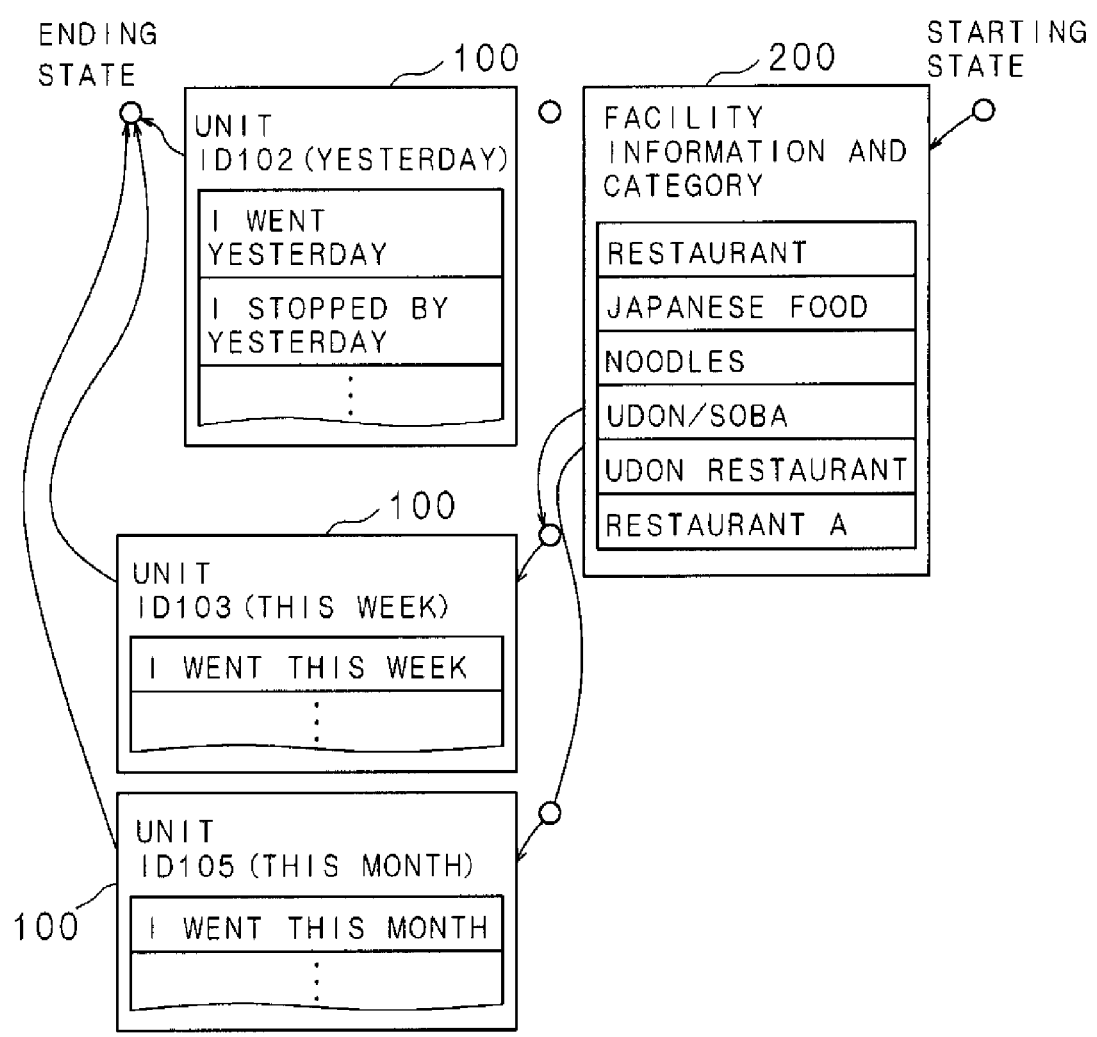
FIG. 8 is an explanatory drawing illustrating an example of a grammar generated two days later.

Moreover, the CPU 11 is also able to extract "Restaurant A" the user went on July 7 if it voice-recognizes "Udon restaurant" and "I went this month." The CPU 11 performs a changing process, which will be described below, when the date output from the clock unit 18 changes. FIG. 8 is an explanatory drawing illustrating an example of a grammar generated two days later. The CPU 11 outputs time passage information corresponding to July 9 by referring to the calendar file 158. The time passage information output here includes "this week" and "this month," but does not include "yesterday." As illustrated in FIG. 8, the connection line between the date unit 100 corresponding to the unit ID 102 and the facility unit 200 is disconnected. Hence, the CPU 11 is not able to extract "Restaurant A" the user went on July 7, even if "Restaurant A" and "I went yesterday" are voice-recognized. On the other hand, the CPU 11 is able to extract "Restaurant A" the user went on July 7, if the voice entries of "noodles" and "this month" or the voice entries of "Udon/Soba" and "I went this week" are recognized.

FIGS. 9A and 9B are explanatory drawings illustrating examples of record layouts of the dictionary DB 157. The dictionary DB 157 stores therein information related to the date unit 100 and the facility unit 200, which will be described below. The dictionary DB 157 includes a search ID field, a unit ID field, a facility ID field, a facility name field and an attribute/category field which is an attribute. Though not illustrated in the drawings due to limitation of space, a search date and the like are also stored therein. In the search ID field, an ID is stored for uniquely identifying facility information searched for on a certain day. In these examples, a search ID "0707001" is given to an Udon restaurant "Restaurant A" that has been searched for on July 7. In the unit ID field, a unit ID is stored for identifying the date unit 100 used in voice recognition.

FIG. 9A illustrates an example of data stored on the same day as the search date of July 7. The time passage information on the same day includes today, this week and this month, so that the date unit 100 including the unit IDs 101, 103 and 105 are read out. Stored in the facility ID field is a facility ID for identifying "Restaurant A."

In the facility name field of the dictionary DB 157, the facility name "Restaurant A" and information on its pronunciation are stored. Stored in the attribute/category field are category information and pronunciation information that are included in the facility unit 200 along with a facility name. Such information is used in a voice recognition process. For the facility name and category, only the ID for each word may be stored, while the pronunciation information for each word stored as well in the dictionary DB 157 may be read out by its ID to the key. To facilitate explanation, the following description is made based on the assumption that pronunciation information corresponding to the date unit 100 and the facility unit 200 is stored in the dictionary unit 157. It may also be possible that voice data is directly stored in the facility name field of the dictionary DB 157 instead of pronunciation information, to perform matching between the stored voice data and the entered voice data.

The CPU 11 stores information related to a search ID, a facility ID, the date unit 100 and the facility unit 200 in the dictionary DB 157 every time it stores a search date and facility information in the history file 155, so as to generate a grammar for voice recognition in the dictionary DB 157. The CPU 11 then changes the content stored in the unit ID field, i.e. a unit ID, in the dictionary DB 157, every time the date changes. FIG. 9B illustrates an example of the stored data for July 8 which is one day later. In the record represented by the search ID "070701," it may be seen that the unit ID 101 indicating "today" is deleted and changed to the unit ID 102 indicating "yesterday."

Figure 10:
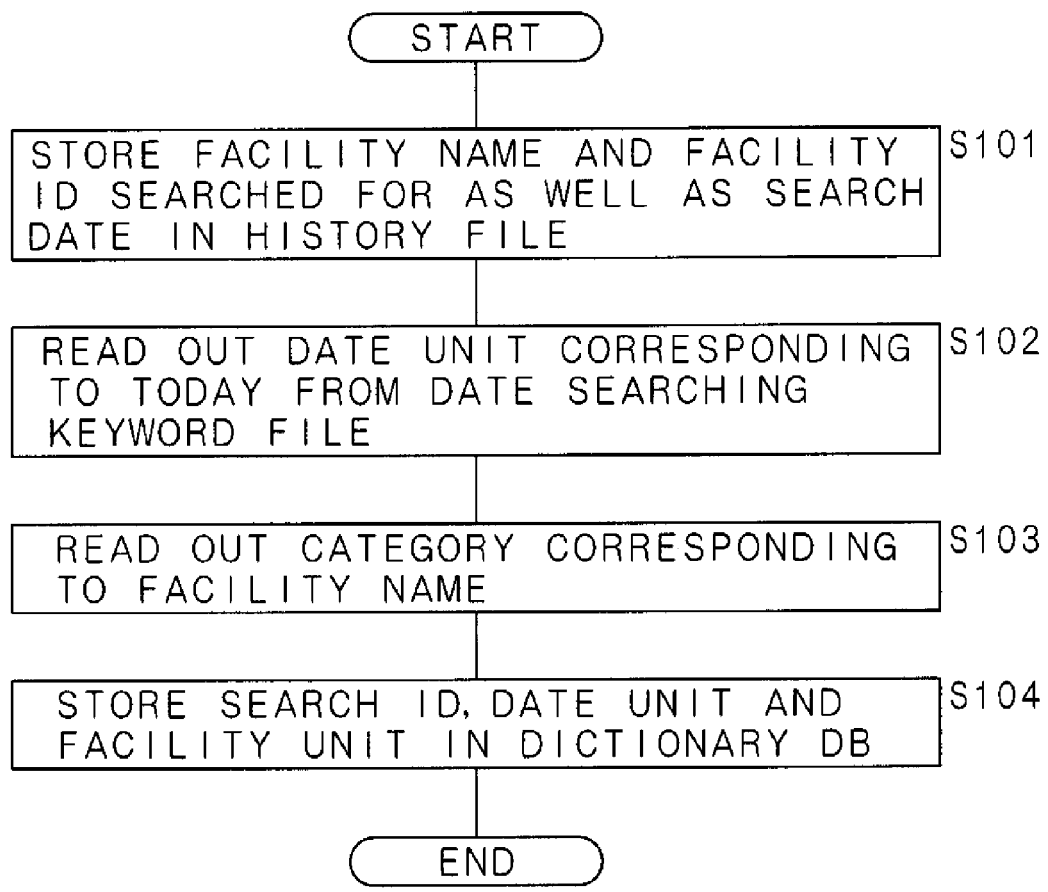
FIG. 10 is an operation chart illustrating an example of the procedure of a grammar generating process.

Explanation is made using an operation chart for the deciding process according to the present embodiment performed by the above-described hardware. FIG. 10 is an operation chart illustrating an example of the procedure of a grammar generating process. The CPU 11 stores a facility name and a facility ID, which are facility information, in the history file 155 along with a search date as illustrated in FIG. 4 (at Operation S101). The CPU 11 reads out the date unit 100 corresponding to today, which is the search date, from the date searching keyword file 156 (at Operation S102). Specifically, the CPU 11 reads out the date unit 100, 100, 100 for the unit IDs 101 (today), 103 (this week) and 105 (this month) corresponding to today that are stored in the rule file 1582. Within one date unit 100, one or a plurality of date searching keyword(s) is/are stored as voice data.

Next, the CPU 11 reads out a category corresponding to the facility name stored at the Operation S101 from the facility DB 154 (at Operation S103). The CPU 11 reads out voice data corresponding to a word for a facility name and voice data corresponding to a word for a category from the dictionary DB 157. The CPU 11 then stores in the dictionary DB 157 the facility unit 200 for which voice data of either the facility name or the category is extracted under the OR condition. The CPU 11 gives a unique search ID so as to generate a grammar. The CPU 11 stores the search ID, the date unit 100 and the facility unit 200, associated with one another, in the dictionary DB 157 as illustrated in FIGS. 9A and 9B (at Operation S104).

Figure 11A:
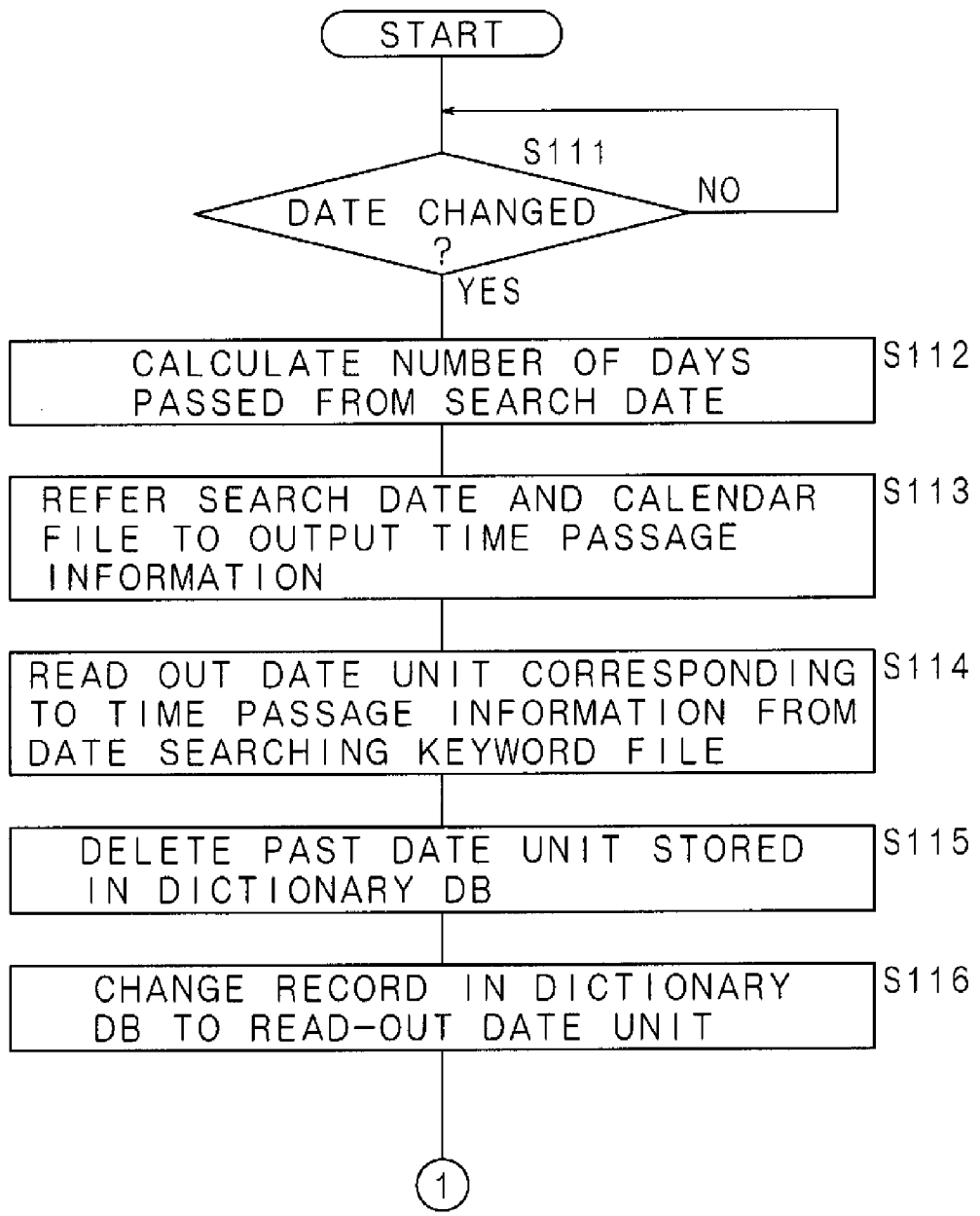
FIGS. 11A to 11C are operation charts illustrating an example of the procedure of a changing process and an extracting process.
Figure 11B:
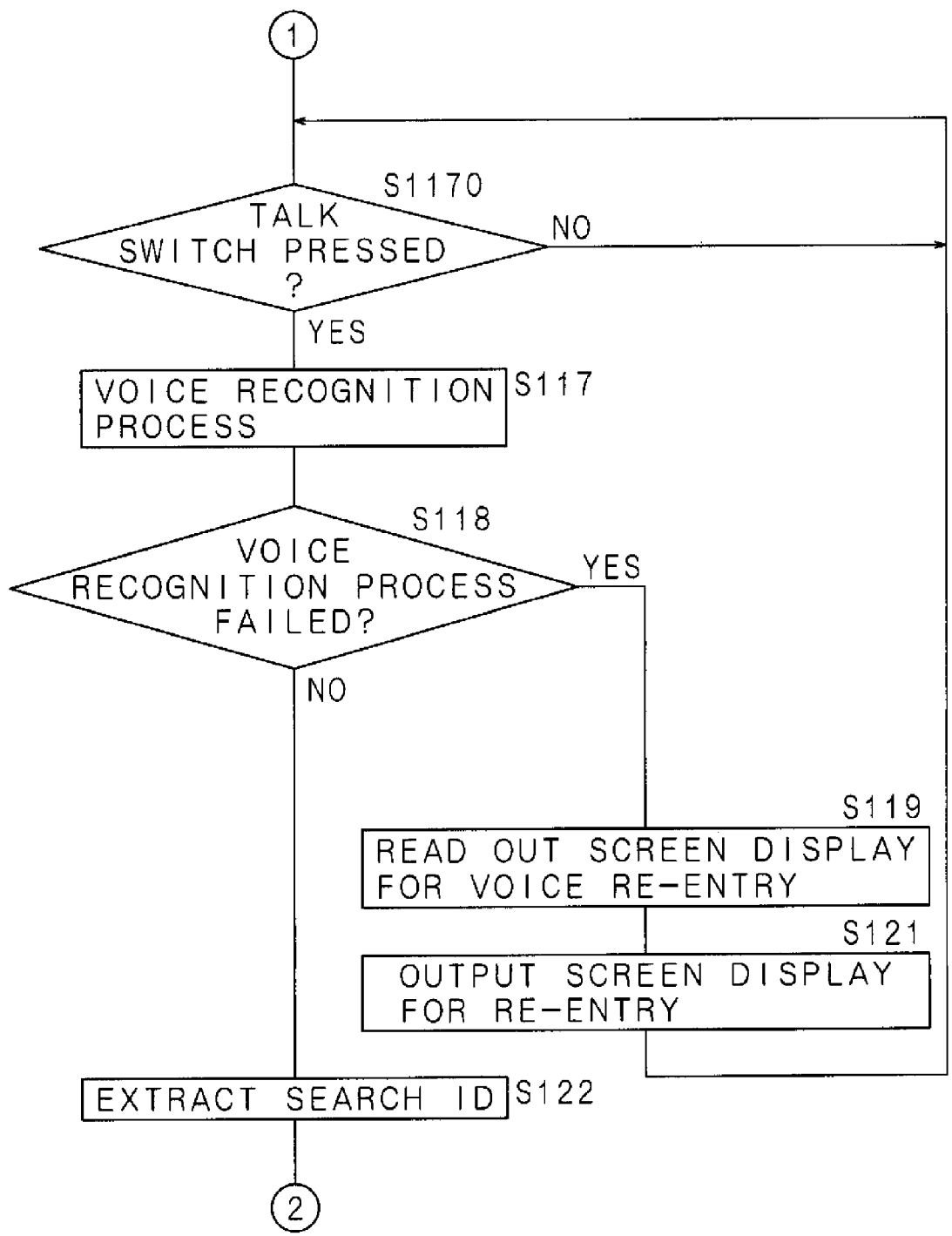
Figure 11C:
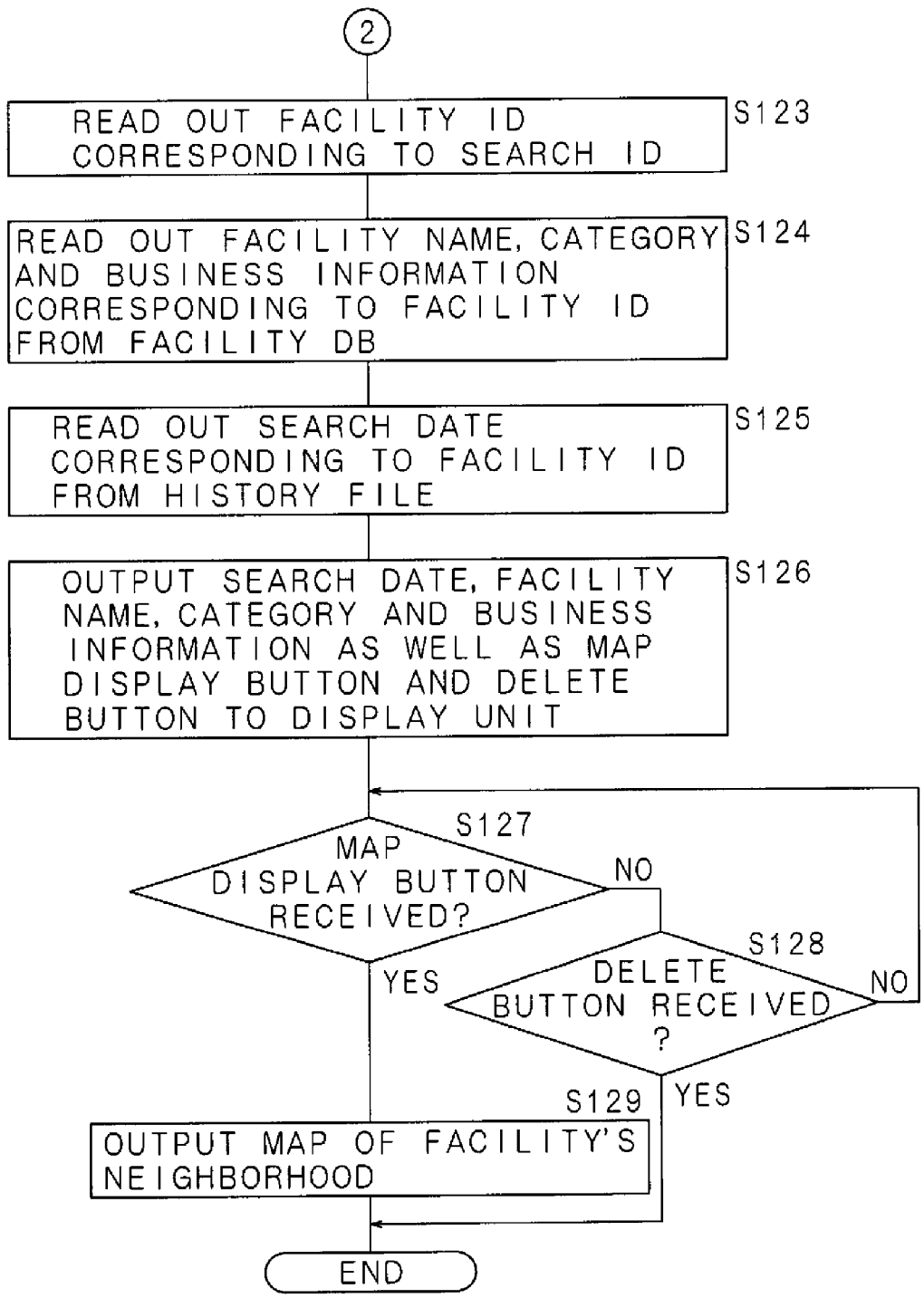

FIGS. 11A to 11C are operation charts illustrating an example of the procedure of a changing process and an extracting process. The CPU 11 observes date and time information output from the clock unit 18 to determine if a date has been changed (at Operation S111). If the CPU 11 determines that the date has not been changed (NO at Operation S111), it waits until the date is changed. If, on the other hand, the CPU 11 determines that the date has been changed (YES at Operation S111), it refers to a date output from the clock unit 18 so as to calculate the number of days passed from a search date on which facility information was searched for (at Operation S112). The CPU 11 refers to the calculated number of days passed, the search date and the calendar file 158 to output time passage information corresponding to a date-related word (at Operation S113). Specifically, the CPU 11 reads out, as described above, the calendar 1581 of a month in which the search date belongs to and that of a month in which the date of the changing process belongs to. The CPU 11 then outputs the time passage information based on the search date, the number of days passed and the date of the changing process with reference to the rule file 1582 in which a rule for time passage information is stored for each day according to the number of days passed from the search date.

The CPU 11 reads out the date unit 100 corresponding to the output time passage information from the date searching keyword file 156 (at Operation S114). The CPU 11 deletes the record for the date unit 100 in the past stored in the dictionary DB 157 (at Operation S115). The CPU 11 then changes the record in the dictionary DB 157 to the date unit 100 read out at the Operation S114 (at Operation S116). Such processes described above are executed for the date unit 100 corresponding to every search ID stored in the dictionary DB 157. As a result, a grammar used for voice recognition is changed as a day passes.

The user who wish to conduct a search with voice recognition presses a talk switch (not illustrated) to enter a combination of a facility name and a date searching keyword, or a combination of a category and a date searching keyword from the microphone 110. The CPU 11 determines if the talk switch is pressed (at Operation S1170). If the CPU 11 determines that the talk switch is not pressed (NO at Operation S1170), it waits until the switch is pressed. If the CPU 11 determines that the talk switch is pressed (YES at Operation S1170), it performs a voice recognition process using the voice data and grammar entered from the microphone 110 (at Operation S117). Specifically, the CPU 11 receives a facility name or a category and a date searching keyword. The CPU 11 determines if it failed the voice recognition process (at Operation S118). For example, the CPU 11 determines that the voice recognition is a failure when it could not obtain a recognition candidate that satisfies a given standard in the voice recognition process at the Operation S117 described above. If the CPU 11 determines that the voice recognition is a failure (YES at Operation S118), it reads out a screen display from a storage unit 15 urging the user to re-enter the voice (at Operation S119). The CPU 11 outputs the read out screen display, which urges the user to re-enter, to the display unit 14 (at Operation S121). The CPU 11 returns the process back to S1170. Specifically, the CPU 11 determines if a facility name or a category is stored in the facility unit 200 as voice data while a date searching keyword corresponding to the received voice data is stored in the date unit 100 of the dictionary DB 157. If the CPU 11 determines that these two factors are not stored in the above-described order under the AND condition, it moves on to the Operation S119. It is also possible that a voice urging re-entry may be output from the loud speaker 19 instead of a screen display on the display unit 14.

If the CPU 11 determines that the voice recognition process is not a failure (NO at Operation S118), it extracts a corresponding search ID (at Operation S122). Specifically, if the CPU 11 determines that the two factors of the facility name or category and the date searching keyword are stored in this order under the AND condition, it extracts a corresponding search ID. The CPU 11 reads out a facility ID corresponding to the search ID from the dictionary DB 157 (at Operation S123). The CPU 11 reads out a facility name, a category, business information and the like corresponding to the facility ID from the facility DB 154 (at Operation S124). The CPU 11 also reads out a search date corresponding to the facility ID from the history file 155 (at Operation S125). The CPU 11 outputs the search date, the facility name, the category and the business information as well as a map display button and a delete button to the display unit 14 (at Operation S126).

Figure 12:
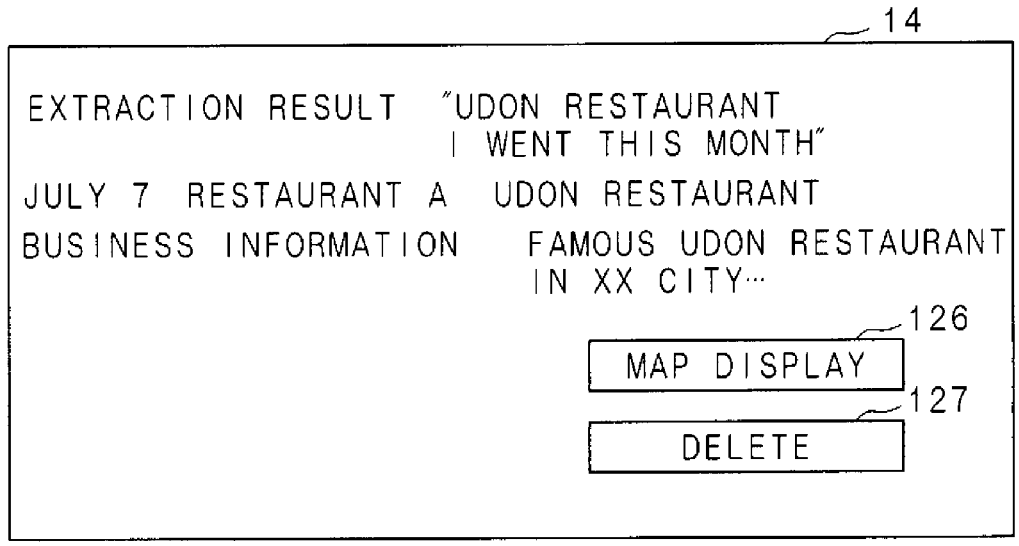
FIG. 12 is an explanatory drawing illustrating an example of a display image of an extraction result.

FIG. 12 is an explanatory drawing illustrating an example of a display image of an extraction result. The CPU 11 displays the read-out facility name, category and business information on a template grammar pre-stored in the storage unit 15. A link with the facility ID is set to a map display button 126, which is displayed as an icon on the display unit 14 as illustrated in FIG. 12. Moreover, a delete button 127 provided with a command for deleting a result displaying screen is also displayed on the display unit 14. In addition, a grammar "Udon restaurant I went this month" obtained by matching between the voice-recognized grammar and the grammar stored in the dictionary DB 157 is displayed. Furthermore, a search date and time, a facility name, a category such as an Udon restaurant, a restaurant or the like and business information are displayed as an extraction result on the display unit 14. This enables the user to appropriately extract desired facility information even if he/she does not exactly remember the date or the facility name.

The CPU 11 determines if the entry of the map display button 126 is received from the entry unit 13 (at Operation S127). If the CPU 11 determines that the entry of the map display button 126 is not received (NO at Operation S127), it determines if the entry of the delete button 127 is received (at Operation S128). If the CPU 11 determines that the entry of the delete button 127 is not received (NO at Operation S128), it returns the process back to the Operation S127. If, on the other hand, the CPU 11 determines that the entry of the delete button 127 is received (YES at Operation S128), it terminates the process. If the CPU 11 determines that the entry of the map display button 126 is received at the Operation S127 (YES at Operation S127), it reads out a map of the facility's neighborhood from the map DB 151 based on the facility ID, to output the map on the display unit 14 (at Operation S129).

Embodiment 2

Embodiment 2 relates to a process performed when a plurality of extraction results are obtained. FIG. 13 is an explanatory drawing illustrating an example of a record layout of the dictionary DB 157 according to Embodiment 2. FIG. 13 illustrates an example wherein the user conducted a search for an Udon restaurant "Restaurant A" on July 1st, a search for a pasta restaurant "Restaurant E" on July 2nd, and a search for the Udon restaurant "Restaurant A" again on July 7 in the manner described in Embodiment 1. Because the record indicated by the search ID "0701001" includes time passage information of last week and this month, the date unit 100 for the unit ID 104 (last week) and the unit ID 105 (this month) is stored in the dictionary DB 157 after the changing process.

Likewise, since the search ID "0702005" also has the same time passage information of last week and this month as the search ID "0701001," the date unit 100 for the unit ID 104 (last week) and the unit ID 105 (this month) is stored in the dictionary DB 157 after the changing process. Though Restaurant E is a pasta restaurant, it has a commonality with the Udon restaurant "Restaurant A" because they are both provided with the category of "restaurant." If the user voice-entered "restaurant" and "I went this month," three candidates are extracted that match with the category "restaurant" and the date searching keyword "I went this month" under the AND condition, as described in Embodiment 1. The candidates here are the Udon restaurant "Restaurant A" that was searched for on July 1st and 7, and the pasta restaurant "Restaurant E" that was searched for on July 2nd.

In the present embodiment, a process is performed to output a search date or the search date and a category which is an attribute on the display unit 14, when a plurality of facility information is extracted, in order to assist the search based on an ambiguous speech entered by the user. Though it is also possible to display only the search date, in the present embodiment, an example is described wherein both the search date and the category are displayed. FIG. 14 is an explanatory drawing illustrating an example of a display image of an extraction result according to Embodiment 2. The CPU 11 displays a plurality of search dates, facility names, categories and business information that are read out on a template grammar pre-stored in the storage unit 15. The map display button 126 which is associated with a facility ID corresponding to each facility name is also displayed. Furthermore, the delete button 127 provided with a command for deleting the result displaying screen is displayed on the display unit 14.

FIG. 15 is an operation chart illustrating an example of the procedure of an output process. The CPU 11 extracts a search ID from the dictionary DB 157 as performed at the Operation S122 in Embodiment 1 (at Operation S161). The CPU 11 determines if a plurality of search IDs are extracted (at Operation S162). If the CPU 11 determines that no more than one search ID is extracted (NO at Operation S162), it terminates the process so as to perform the processes as described in Embodiment 1. In this case, the CPU 11 returns the process back to the Operation S123. If the CPU 11 determines that a plurality of search IDs are extracted (YES at Operation S162), it reads out a facility ID corresponding to each of the search IDs from the dictionary DB 157 (at Operation S163). The CPU 11 reads out a facility name, a category, business information and the like corresponding to each facility ID from the facility DB 154 (at Operation S164). The CPU 11 also reads out a search date corresponding to each facility ID from the dictionary DB 157 (at Operation S165). The CPU 11 outputs the search date, the facility name, the category and the business information that correspond to each search ID as well as the map display button 126 and the delete button 127 to the display unit 14 as illustrated in FIG. 14 (at Operation S166). Accordingly, even if the user has a vague memory of the date searching keyword or if the user voice-enters a wide range of category, a search date, a facility name, business information and the like that may be the key for tracing back the user's memory will visibly be displayed on the display unit 14. This enables the user to more efficiently obtain a search result.

Since Embodiment 2 includes a structure as described above while the other structures are similar to those of Embodiment 1, corresponding parts are provided with the same reference numbers and will not be described here in detail.

Embodiment 3

Embodiment 3 relates to a configuration wherein time passage information is expanded. For example, if the user searches for an Udon restaurant at the beginning of the year and then again searches for the same restaurant by voice recognition six months later, the user needs to enter "Udon restaurant I went this year" since the time passage information here is "this year." The user, however, may not have a clear memory and think that it was the end of last year by mistake. In the present embodiment, time passage information is expanded by referring to a relevancy file. For example, a different date-related word "last year" is used as expanded time passage information. This enables the user to search for Restaurant A by entering "Udon restaurant I went last year." Detailed description will be made below.

Figure 16:
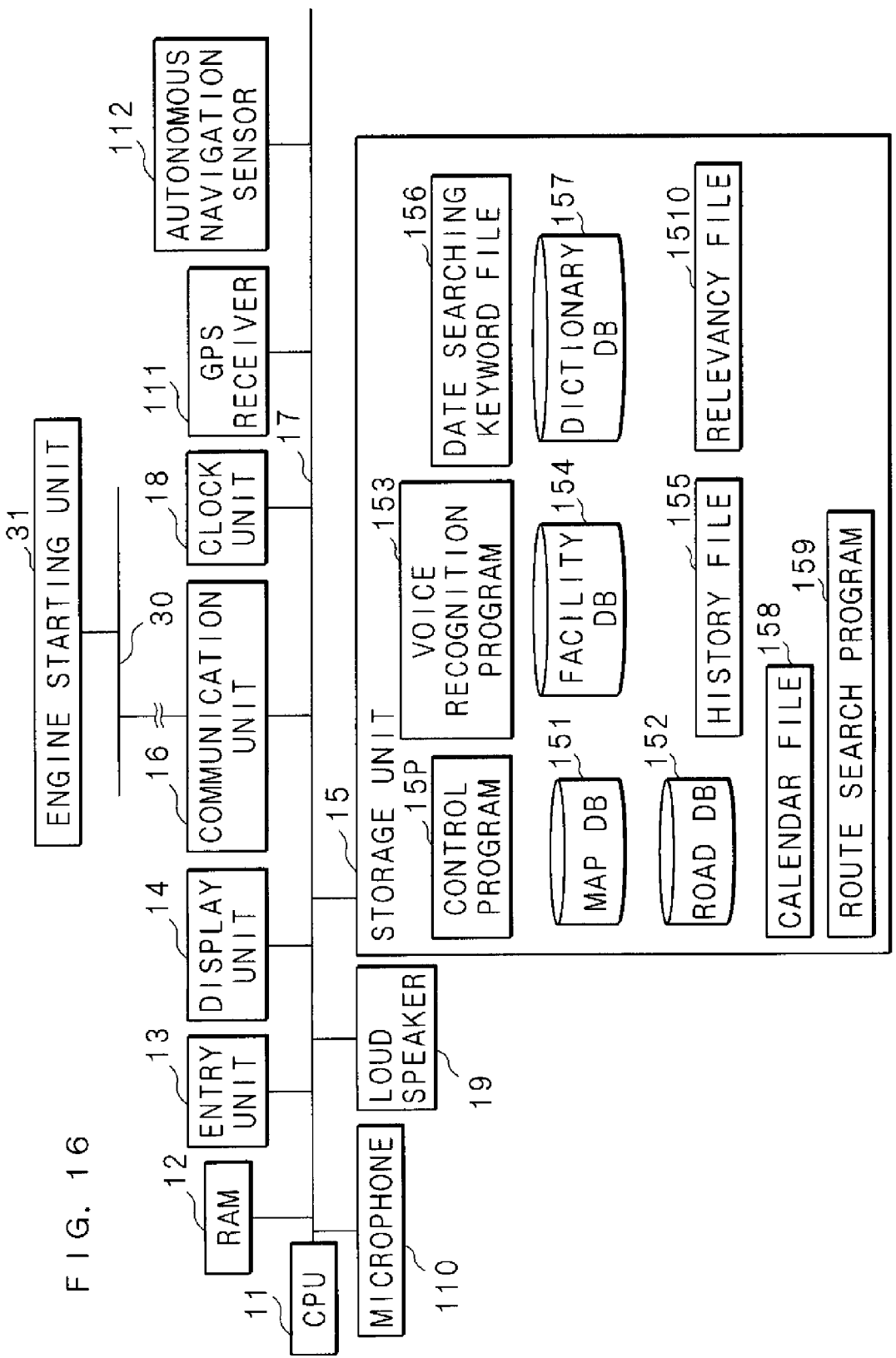
FIG. 16 is a block diagram illustrating an example of a hardware group of a car navigation device according to Embodiment 3.

FIG. 16 is a block diagram illustrating an example of a hardware group of the car navigation device 1 according to Embodiment 3. In addition to the Embodiment 1, a relevancy file 1510 is stored in the storage unit 15. FIG. 17 is an explanatory drawing illustrating an example of a record layout of the relevancy file 1510. The relevancy file 1510 stores therein time passage information and a search date field as well as an expanded time passage information field. In the relevancy file 1510, passage information which is a date-related word to be expanded is stored in association with the time passage information and the search date.

In the time passage information and search date field, the time passage information and a month or a date are stored in association with each other. The expanded time passage information field stores therein a date-related word different from the date-related word which is the time passage information stored in the time passage information and search date field. For example, if the time passage information is "this year" while the search date is in "January," the word "last year" that is nearest of "this year" is stored as expanded time passage information. This makes it possible to eliminate a slippage loss in a search due to the user's vague memory around yearend and New Year time. Similarly, if the time passage information is "last year" while the search date is in "December," the expanded time passage information will be "this year." Also, if the time passage information is "this month" while the search date is one of "1st" to "5th," the expanded time passage information will be "last month," since the days at the beginning of a month may easily be mistaken as "last month." Likewise, if the time passage information is "last month" while the search date is one of "25" to "31," the expanded time passage information will be "this month", since those days may easily be mistaken as "this month." The rule stored in the relevancy file 1510 is merely an example, and the present embodiment is not limited thereto.

Figure 18:
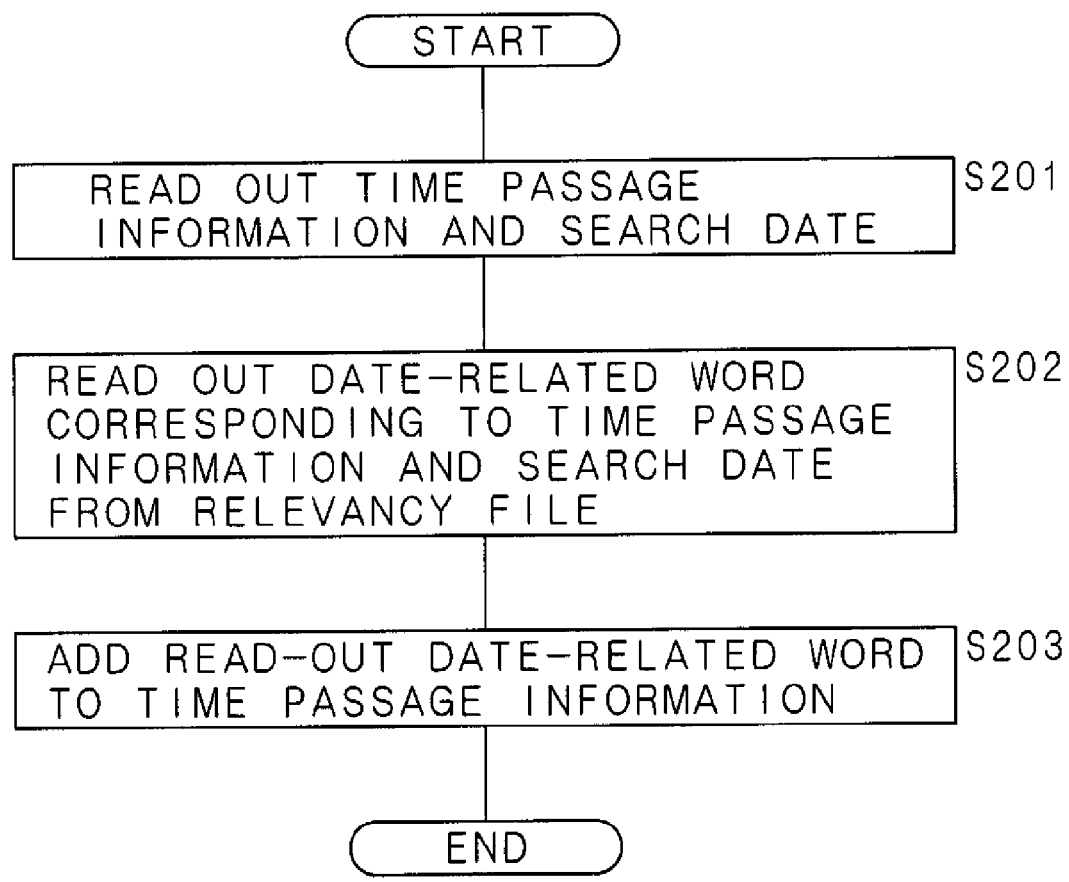
FIG. 18 is an operation chart illustrating an example of the procedure of an expansion process for time passage information.

FIG. 18 is an operation chart illustrating an example of the procedure of an expansion process for time passage information. As a subroutine between the Operations S113 and S114 described in Embodiment 1, the following processes may be executed. The CPU 11 reads out the time passage information output at the Operation S113 and the search date stored in the dictionary DB 157 (at Operation S201). The CPU 11 reads out a date-related word corresponding to the time passage information and the search date from the relevancy file 1510 illustrated in FIG. 17 (at Operation S202). The CPU 11 performs a process for adding, to the time passage information, the read-out date-related word to be expanded (at Operation S203).

Accordingly, "last year" is added to the original time passage information of "this year," expanding the time passage information. Thereafter, the processes from the Operation S114 on are executed based on the time passage information including the added date-related word. While Embodiments 1 to 3 illustrate examples wherein the search target is facility information, it is not limited thereto. For example, the search target may include information of various products such as a book, a Digital Versatile Disc (DVD) movie, a music file and the like. In the case of a music distribution service, for example, a server computer, a personal computer or a mobile phone is used instead of the car navigation device 1. The user enters with voice entry, from the personal computer or the like, "XX (the title of a music indicating a product name)" and "I bought yesterday," "AA (an artist name indicating a category)" and "I bought yesterday," "pop music" and "I downloaded last month" or the like. The voice data is transmitted to a server computer via the Internet. The server computer performs processes similar to those performed by the car navigation device 1 to extract a music title, which is product information. The extracted music title is transmitted to the personal computer or the like. The result of the search with voice entry or a keyboard is similarly stored in the server computer as a history, for which a date changing process is performed.

Since Embodiment 3 includes a structure as described above while the other structures are similar to those of Embodiments 1 and 2, corresponding parts are provided with the same reference numbers and will not be described here in detail.

Embodiment 4

Figure 19:
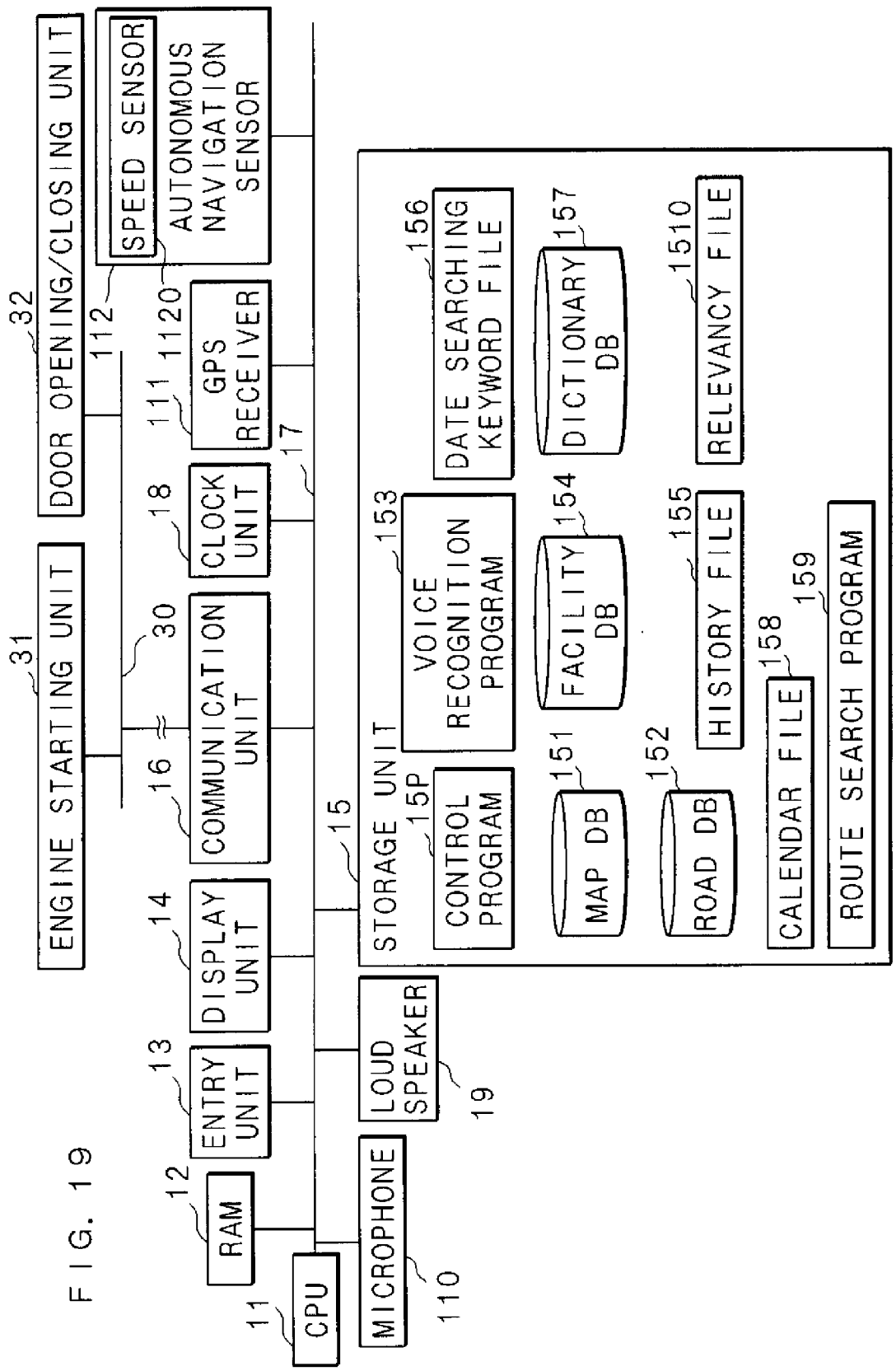
FIG. 19 is a block diagram illustrating an example of a hardware group of a car navigation device according to Embodiment 4.

Embodiment 4 relates to a technology for including information on a facility the user actually stopped by, in addition to the facility information obtained by a search. FIG. 19 is a block diagram illustrating an example of a hardware group of the car navigation device 1 according to Embodiment 4. A door opening/closing sensor 32 and a speed sensor 1120 are added to the Embodiment 3. The speed sensor 1120 outputs the speed of a car to the CPU 11. The door opening/closing sensor 32 outputs an open signal indicating that the door of a vehicle is opened and a close signal indicating that it is closed to the CPU 11 through the CAN bus 30. The CPU 11 acquires positional information from the GPS receiver 111 which acts as a unit for acquiring positional information, when the vehicle is halted for a given time or longer.

It may be determined that a vehicle is halted for a given time or longer if, for example, the speed output from the speed sensor 1120 stays 0 kilometers for one hour or longer. In addition to the condition above, the determination may be made under the condition that an open signal is output from the door opening/closing sensor 32, so as to eliminate the situation where the car is stopped due to heavy traffic. Moreover, the CPU 11 stores in the storage unit 15 a date and time at which an engine stop signal is output from the engine starting unit 31 by referring to an output from the clock unit 18. The CPU 11 then stores in the storage unit 15 the date and time at which an engine start signal is output the next time from the engine starting unit 31, by referring to an output from the clock unit 18. The CPU 11 may determine that the vehicle is halted for a given time or longer when the difference between the date and time at which the engine is stopped and the date and time at which the engine is started corresponds to a given time, e.g. one hour, or longer. In the present embodiment, an example wherein the vehicle is determined as halted for a given time or longer based on the difference between the time at which the engine is stopped and the time at which the engine is started will be described to facilitate explanation.

The CPU 11 reads out from the facility DB 154 facility information corresponding to the positional information acquired from the GPS receiver 111 when the vehicle is halted for a given time or longer. Moreover, the CPU 11 stores in the storage unit 15 the date on which the engine is stopped as an acquisition date. The CPU 11 stores the acquisition date in the history file 155 as a search date while it stores the facility ID and facility name read out from the facility DB 154 in the history file 155.

FIG. 20 is an explanatory drawing illustrating an example of a record layout of the history file 155 according to Embodiment 4. In the example illustrated in FIG. 20, a history for the fact that the user stopped by at a pasta restaurant "Restaurant E" of the facility ID "005" on Jul. 9, 2008 without a search is stored. The CPU 11 stores an acquisition date in the search date field. The CPU 11 also stores a flag in an acquisition date flag field in order to store the fact that the facility information is acquired not by a search but by a vehicle halting for a given time or longer. In the example illustrated in FIG. 20, a flag is represented by a white circle.

Figure 21:
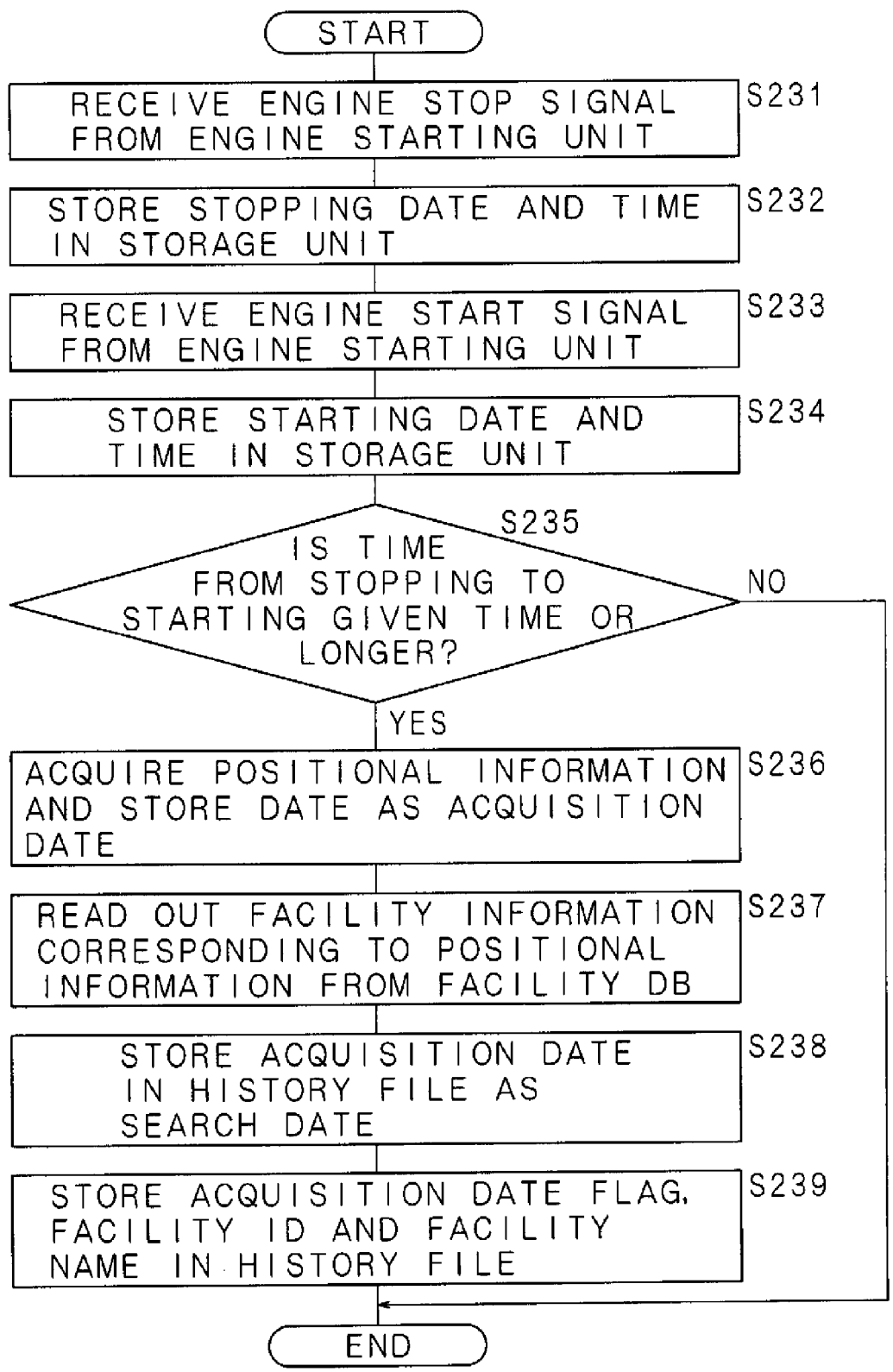
FIG. 21 is an operation chart illustrating an example of the procedure of a process for acquiring facility information.

FIG. 21 is an operation chart illustrating an example of the procedure of a process for acquiring facility information. The CPU 11 receives an engine stop signal from the engine starting unit 31 (at Operation S231). The CPU 11 stores a stopping time, i.e. the date and time at which the engine is stopped, in the storage unit 15 with reference to the date and time output from the clock unit 18 (at Operation S232). The CPU 11 then receives an engine start signal from the engine starting unit 31 (at Operation S233). The CPU 11 stores the starting time, i.e. the date and time at which the engine is started, in the storage unit 15 (at Operation S234). The CPU 11 determines if the time from the stopping time stored at the Operation S232 to the starting time stored at the Operation S234 corresponds to a given time pre-stored in the storage unit 15 or longer (at Operation S235). If the CPU 11 determines that it is shorter than the given time (NO at Operation S235), it terminates the process by determining the halt of the vehicle is temporary.

If the CPU 11 determines that it is a given time or longer (YES at Operation S235), it acquires the positional information output from the GPS receiver 111, while it stores a date output from the clock unit 18 in the storage unit 15 as an acquisition date (at Operation S236). The CPU 11 reads out facility information corresponding to the acquired positional information from the facility DB 154 (at Operation S237). The facility information is, for example, a facility name and a facility ID. The CPU 11 stores the acquisition date in the search date field of the history file 155 as a search date (at Operation S238). The CPU 11 also stores an acquisition date flag, a facility ID and a facility name in the history file 155, as illustrated in FIG. 20 (at Operation S239). The CPU 11 sets the acquisition date as a search date, while it processes the acquired facility information in a manner similar to facility information obtained by a search. The subsequent processes are similar to those from the Operation S102 on in Embodiment 1, which will not be described here in detail.

Since Embodiment 4 includes a structure as described above while the other structures are similar to those of Embodiments 1 to 3, corresponding parts are provided with the same reference numbers and will not be described here in detail.

Embodiment 5

Embodiment 5 relates to a configuration wherein neighborhood facility information near the facility information which was searched for or stopped by is utilized. FIG. 22 is an explanatory drawing illustrating an example of a record layout of the facility DB 154 according to Embodiment 5. For the facility name "F station" indicated by the facility ID "007," a category of "station," a category of "private railroad" which is a higher conception of the category "station," and "railroad" which is a higher conception of the category "private railroad" are stored. For "G hotel" indicated by the facility ID "008," a category of "hotel" and a category of "accommodation facility" which is a higher conception of the category "hotel" are stored. In the present embodiment, an example is described wherein F station is located near Restaurant A, while G hotel is located near Restaurant B.

It is common for the user to remember landmarks such as a station, a hotel, a stadium, a television tower, a historic and scenic place, an airport, a school, an amusement park, a highway interchange, a department store and the like despite of time passage. For example, even if the user does not remember the name of Restaurant A, F station which is a landmark may work as a clue for the user to find the restaurant. The facility DB 154 is provided with a landmark field as illustrated in FIG. 22, in which information related to a landmark near each facility is stored in association with each facility. For example, F station is stored as a landmark near Restaurant A, while G hotel is stored as a landmark near Restaurant B.

Likewise, H department store is stored as a landmark near F station while D land is stored as a landmark near G hotel. More than one landmarks may be stored, whereas no landmarks may be stored if there are not any landmarks nearby. In the present embodiment, though an example is described wherein a landmark pre-stored in association with a facility is extracted from the facility DB 154, it is not limited thereto. For example, the CPU 11 may calculate a distance between Restaurant A and F station based on their positional information, to extract F station as a landmark for Restaurant A when the calculated distance is within a certain length, e.g. 100 meter, or shorter, and when the facility name "F station" is stored in the landmark flag.

FIG. 23 is an explanatory drawing illustrating an example of a record layout of the dictionary DB 157 according to Embodiment 5. As attributes to facility information, a neighborhood facility ID filed and a neighborhood facility name field for a landmark are stored in addition to the category field. Stored in the neighborhood facility name field is the name of a neighborhood facility "F station" associated with the facility name "Restaurant A." Moreover, stored in the neighborhood facility ID field is the neighborhood facility ID "007" corresponding to the neighborhood facility name "F station." When the CPU 11 stores a facility ID in the dictionary DB 157, it refers to the facility DB 154 to store in the dictionary DB 157 a neighborhood facility name and a neighborhood facility ID stored in the landmark field.

Figure 24:
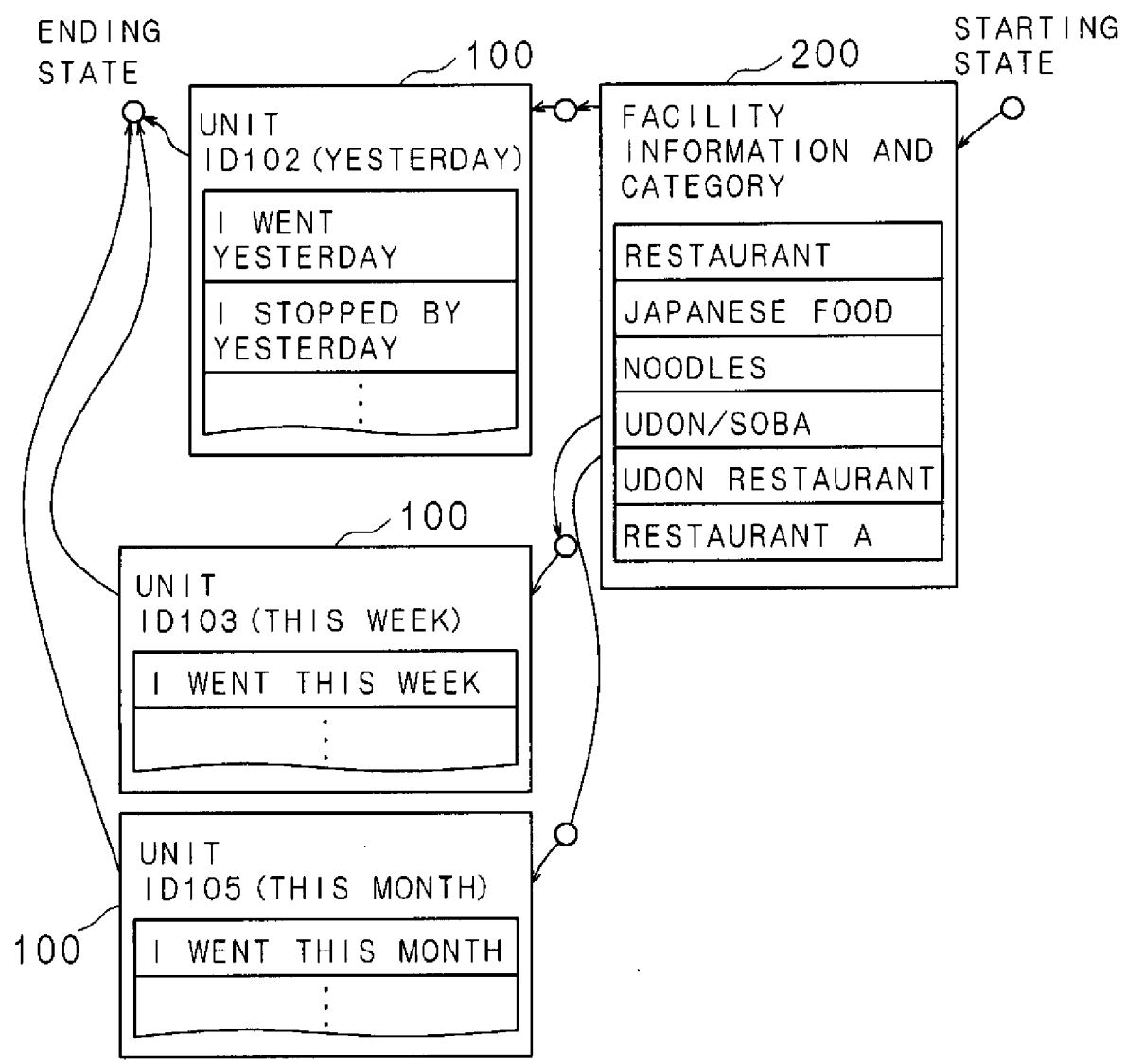
FIG. 24 is an explanatory drawing illustrating an example of a grammar generated one day later.

In the acquisition flag field, a flag is stored indicating that the facility information is acquired not by a search but by halting for a given time or longer, as described in Embodiment 4. In the example illustrated in FIG. 23, Restaurant A is the facility information obtained by a search as described in Embodiment 1, whereas Restaurant E is the facility information acquired by halting for a given time or longer. FIG. 24 is an explanatory drawing illustrating an example of a grammar generated one day later. In the facility unit 200, facility information "Restaurant A" is added, as voice data, along with a category "restaurant" and the like that is an attribute thereof as well as neighborhood facility information "F station." This allows the CPU 11 to extract the Udon restaurant "Restaurant A" identified by the search ID "0701001" even in the case where the user entered by voice "F station" and "I went this month" instead of "Restaurant A" and "I went this month." Hence, even if the user has a vague memory, facility information may be extracted by using a landmark with a strong impression as a clue. This has an effect on a search for a small shop, a personal residence or a building for which no category of a facility name exists.

Figure 25:
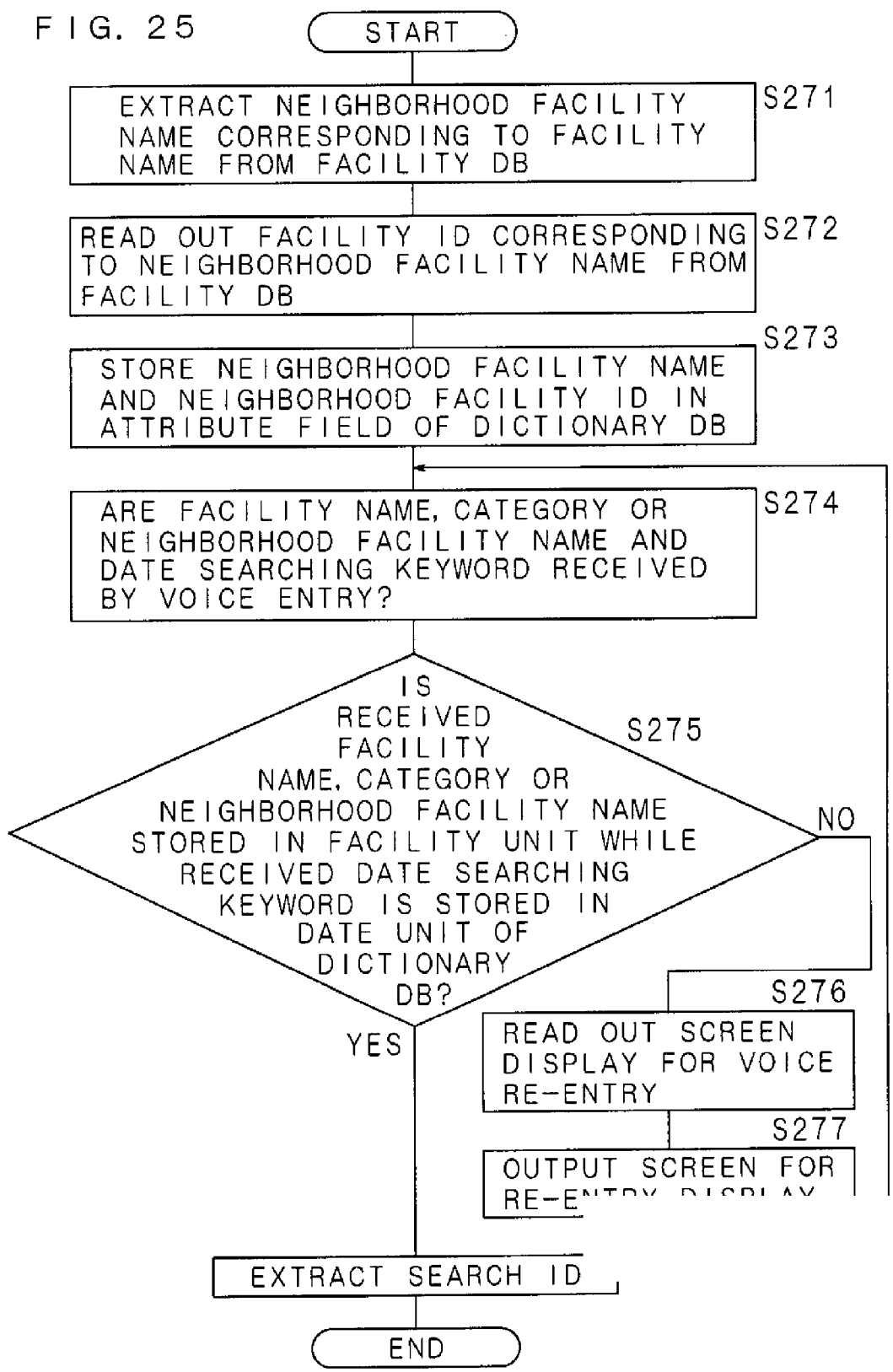
FIG. 25 is an operation chart illustrating an example of the procedure of an extraction process for neighborhood facility information and an extraction process for a search ID.

FIG. 25 is an operation chart illustrating an example of the procedure of an extraction process for neighborhood facility information and an extraction process for a search ID. The processes described below are executed after the process at the Operation S104 described in Embodiment 1. The CPU 11 extracts a neighborhood facility name corresponding to the facility name stored at the Operation S104 by referring to the landmark field in the facility DB 154 (at Operation S271). The CPU 11 reads out a facility ID corresponding to the neighborhood facility name from the facility DB 154 (at Operation S272). The CPU 11 stores in the attribute field of the dictionary DB 157 the extracted neighborhood facility name and the read-out neighborhood facility ID (at Operation S273).

After the changing process for a date searching keyword in the dictionary DB 157 described in Embodiment 1, the CPU 11 receives voice data entered from the microphone 110, including a facility name, a category or a neighborhood facility name and a date searching keyword (at Operation S274). The CPU 11 determines if a facility name, a category or a neighborhood facility name is stored in the facility unit 200 as voice data while a date searching keyword for the received voice data is stored in the date unit 100 of the dictionary DB 157 (at Operation S275). If the CPU 11 determines that these two factors are not stored in the above-described order under the AND condition (NO at Operation S275), it reads out a screen display from the storage unit 15, urging the user to re-enter the voice (at Operation S276). The CPU 11 outputs the read-out screen display for urging the user to re-entry on the display unit 14 (at Operation S277). The CPU 11 returns the process back to S274. If the CPU 11 determines that a facility name, a category or a neighborhood facility name and a date searching keyword are stored in this order under the AND condition (YES at Operation S275), it extracts a corresponding search ID (at Operation S278). The subsequent processes are similar to those from the Operation S123 on in Embodiment 1, which will not be described here in detail.

Since Embodiment 5 includes a structure as described above while the other structures are similar to those of Embodiments 1 to 4, corresponding parts are provided with the same reference numbers and will not be described here in detail.

Embodiment 6

The present embodiment relates to an extraction process performed in further consideration of a neighborhood searching keyword including neighborhood facility information. FIG. 26 is an explanatory drawing illustrating an example of a record layout of the dictionary DB 157 according to Embodiment 6. The dictionary DB 157 is further provided with a neighborhood unit ID field and a neighborhood facility information field which includes a neighborhood facility ID field and a neighborhood facility name field. The neighborhood facility information, which is a landmark, is utilized not as an attribute as described in Embodiment 5, but as a new search key.

Figure 27:
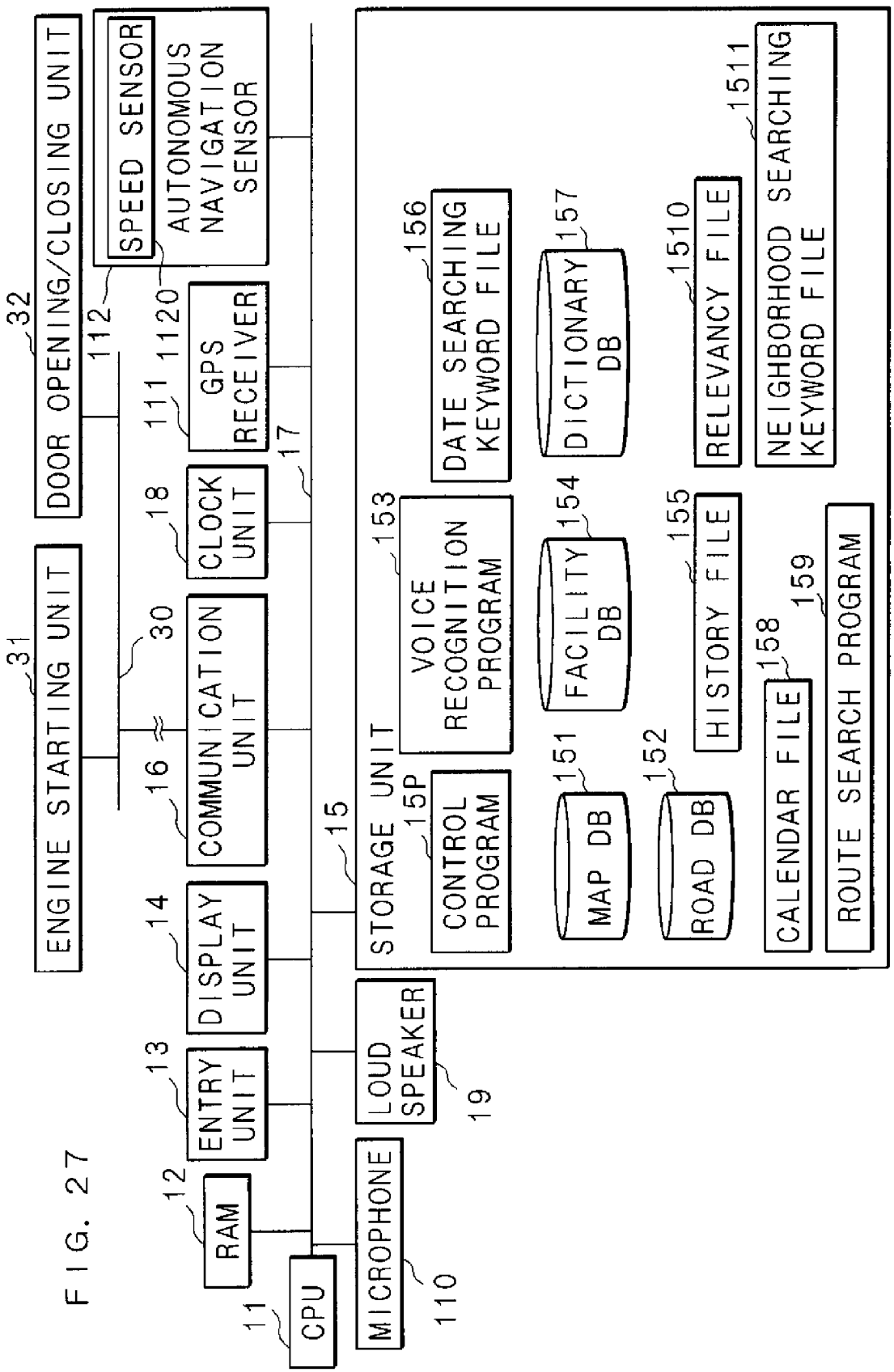
FIG. 27 is a block diagram illustrating an example of a hardware group of a car navigation device according to Embodiment 6.

Stored in the neighborhood facility ID field is a neighborhood facility ID identifying the name of a neighborhood facility that is a landmark, as described in Embodiment 5. Moreover, stored in the neighborhood facility name field is the name of a neighborhood facility that is a landmark. Stored in the neighborhood unit ID field is an ID for identifying a neighborhood searching keyword including words concerning a plurality of neighborhood facility information, as in the date unit 100. FIG. 27 is a block diagram illustrating an example of a hardware group of the car navigation device 1 according to Embodiment 6. The storage unit 15 is provided with a neighborhood searching keyword file 1511.

FIG. 28 is an explanatory drawing illustrating an example of a record layout of the neighborhood searching keyword file 1511. The neighborhood searching keyword file 1511 includes a neighborhood unit ID field, a neighborhood facility name field and a neighborhood searching keyword field. Stored in the neighborhood unit ID field is a unique identification number identifying a neighborhood searching keyword including a word concerning a neighborhood facility name. In the neighborhood facility name field, the name of a neighborhood facility such as "F station," which is a landmark, or the like is stored. For the neighborhood searching keyword, a plurality of neighborhood searching keywords including a word concerning a facility name are stored as voice data for voice recognition. For example, if the neighborhood facility name is F station, a plurality of neighborhood searching keywords including "F station," such as "along F station," "in front of F station," "in front of subway F station," "at F station," "near F station" and the like, are stored.

The set of a plurality of neighborhood searching keywords is hereinafter referred to as a neighborhood unit 150. The neighborhood searching keyword includes a facility name and a prepositional terms such as "along," "in front of," "across from," "near," "inside of." For a word corresponding to a facility name used in a neighborhood searching keyword, a plurality of word patterns may be pre-stored as the word concerning neighborhood facility information. For example, since "G hotel" may be called "hotel G" by voice entry, a plurality of names that are derived from formal facility name are stored. Moreover, "F station" is stored as, for example, "subway F station" or just "F." These neighborhood searching keywords are pre-stored in the neighborhood searching keyword file 1511 for each landmark.

Figure 29:
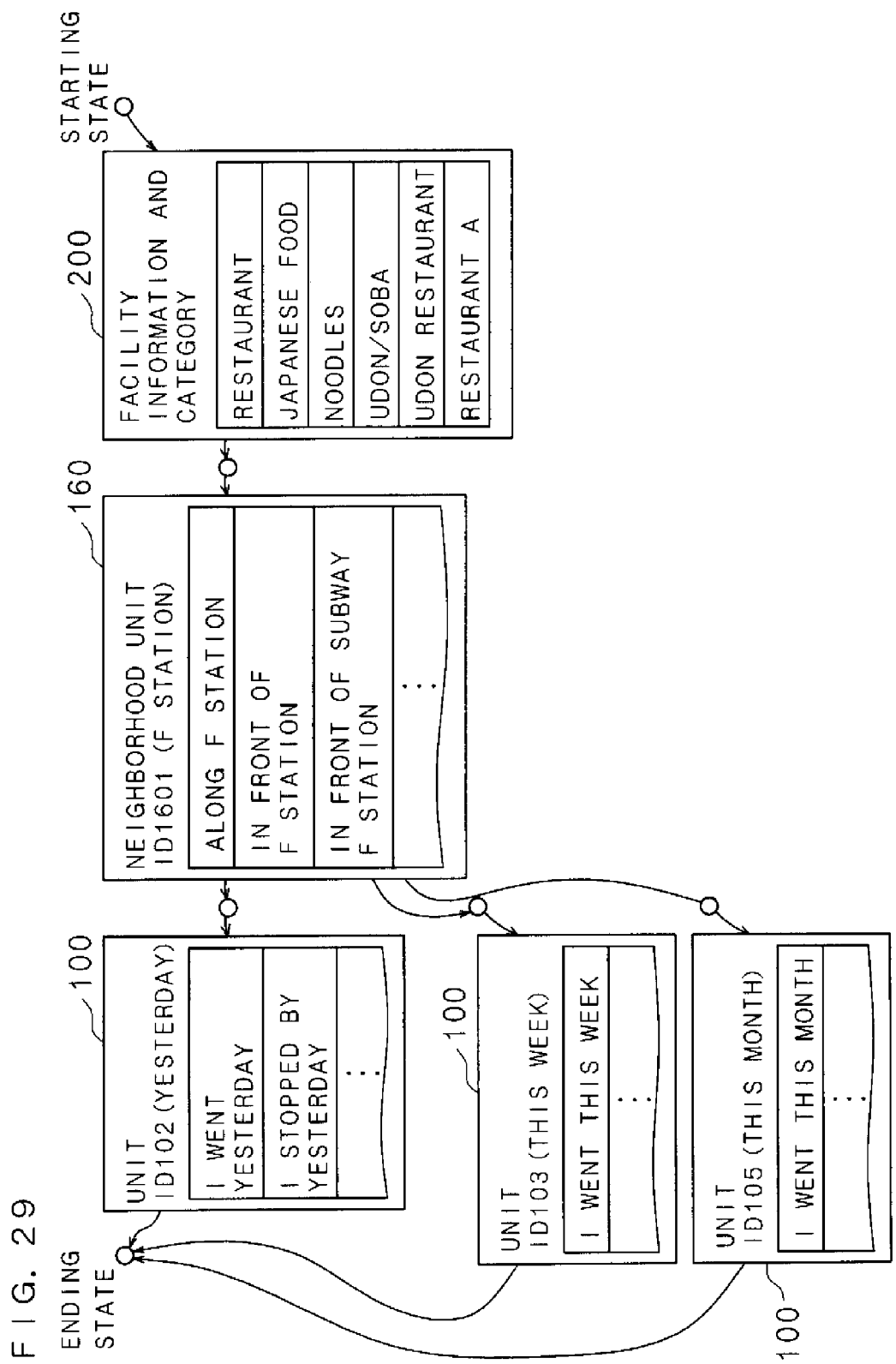
FIG. 29 is an explanatory drawing illustrating an example of a grammar generated one day later.

FIG. 29 is an explanatory drawing illustrating an example of a grammar generated one day later. In addition to the example described in Embodiment 1, a neighborhood unit 150 is inserted between the date unit 100 and the facility unit 200. The CPU 11 reads out a neighborhood unit ID stored in the dictionary DB 157 to read out a neighborhood searching keyword corresponding to the neighborhood unit ID from the neighborhood searching keyword file 1511. In the example illustrated in FIG. 29, a group of neighborhood searching keywords that are given to F station is represented as the neighborhood unit 150. In such a case, when the user enters by voice "a restaurant" "along F station" and "I went this month," the CPU 11 refers to the dictionary DB 157 to extract the search ID "0701001" for which the units are linked with one another from the beginning state to the ending state. As with the date unit 100 and the facility unit 200, one of the plurality of neighborhood searching keywords stored in the neighborhood unit 150 may be used for matching. Though the present embodiment illustrates the example wherein the neighborhood searching keyword includes a facility name and a prepositional term, it is not limited thereto. It may also be possible that the neighborhood searching keyword includes a facility name and a common or another name of the facility name while a prepositional term is stored in a different unit. In such a case, a plurality of prepositional terms are stored in the dictionary DB 157 as preposition searching keywords.

Figure 30A:
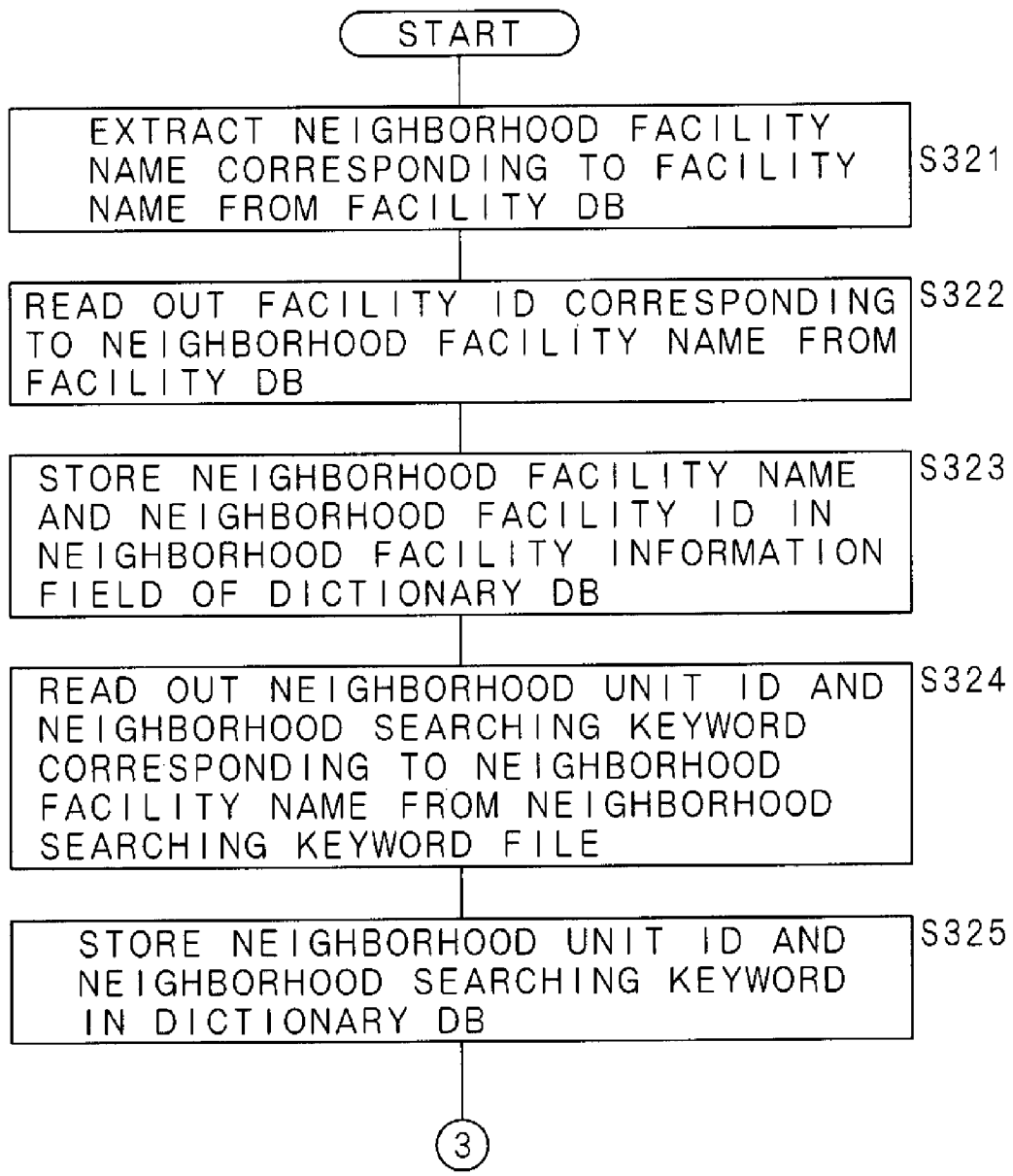
FIGS. 30A and 30B are operation charts illustrating an example of the procedure of an extraction process for neighborhood facility information and an extraction process for a search ID.
Figure 30B:
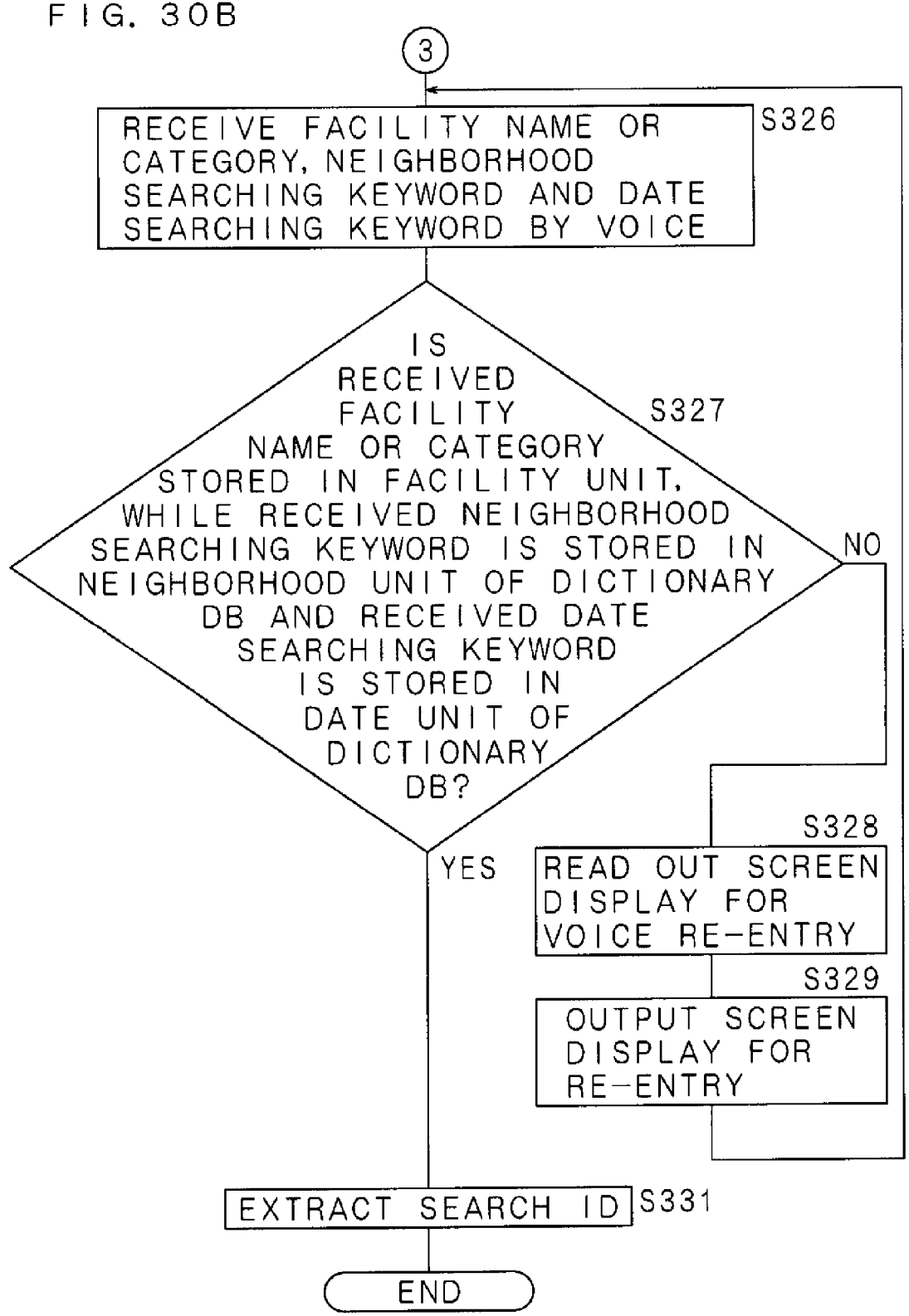

FIGS. 30A and 30B are operation charts illustrating an example of the procedure of an extraction process for neighborhood facility information and an extraction process for a search ID. Processes executed after the Operation S104 in Embodiment 1 are described. The CPU 11 extracts a neighborhood facility name corresponding to the facility name stored at the Operation S104 by referring to the landmark field in the facility DB 154 (at Operation S321). The CPU 11 reads out a facility ID corresponding to the neighborhood facility name from the facility DB 154 (at Operation S322). The CPU 11 stores the extracted neighborhood facility name and the read-out neighborhood facility ID in the neighborhood facility information field of the dictionary DB 157 (at Operation S323).

The CPU 11 reads out a neighborhood unit ID and a neighborhood searching keyword that correspond to the extracted neighborhood facility name from the neighborhood searching keyword file 1511 (at Operation S324). The CPU 11 stores in the dictionary DB 157 the read-out neighborhood unit ID and the neighborhood searching keyword that is voice data (at Operation S325). Accordingly, the neighborhood unit 150 including a group of neighborhood searching keywords related to neighborhood facility information is stored in the dictionary DB 157. It is also possible that the CPU 11 stores only the neighborhood unit ID in the dictionary DB 157, while it reads out the voice data for the neighborhood searching keywords stored in the neighborhood searching keyword file 1511 as needed.

After the changing process for a date searching keyword performed in the dictionary DB 157 as described in Embodiment 1, the CPU 11 receives the voice data including a facility name or a category, a neighborhood searching keyword and a date searching keyword entered from the microphone 110 (at Operation S326). The CPU 11 determines if the received facility name or category is stored as voice data in the facility unit 200, if the received neighborhood searching keyword is stored in the neighborhood unit 150 of the dictionary DB 157, and if the date searching keyword for the received voice data is stored in the date unit 100 of the dictionary DB 157 (at Operation S327).

If the CPU 11 determines that these three factors are not stored in the above-described order under the AND condition (NO at Operation S327), it reads out a screen display from the storage unit 15, urging the user to re-enter the voice (at Operation S328). The CPU 11 outputs the read-out screen display urging re-entry to the display unit 14 (at Operation S329). The CPU 11 returns the process back to S326. If the CPU 11 determines that the facility name or category, the neighborhood searching keyword and the date searching keyword are stored in this order under the AND condition (YES at Operation S327), it extracts a corresponding search ID (at Operation S331). The subsequent processes are similar to those from the Operation S123 on in Embodiment 1, which will not be described here in detail. According to the present embodiment, searching accuracy may be improved despite of the user's vague memory by utilizing a more memorable landmark as a search key.

Since Embodiment 6 includes a structure as described above while the other structures are similar to those of Embodiments 1 to 5, corresponding parts are provided with the same reference numbers and will not be described here in detail.

Embodiment 7

Embodiment 7 relates to a configuration wherein a road searching keyword including a word concerning road information existing near facility information. FIG. 31 is an explanatory drawing illustrating an example of a record layout of the facility DB 154 according to Embodiment 7. The facility DB 154 according to Embodiment 7 is further provided with a road information field. Stored in the road information field is the name of a road near a facility, associated with the name of the facility. For example, because the facility name "Restaurant A" is located along Route 43, Route 43 is stored as the road information. The name of a road near a facility may be pre-stored in the facility DB 154 or extracted by referring to the road DB 152.

Specifically, the CPU 11 reads out positional information corresponding to a target facility name. The CPU 11 extracts a link having positional information for a range of a given distance, e.g. within 50 meters, from the read-out positional information. For the link, latitude and longitude are stored as positional information in the road DB 152 along with a road name, associated with one another. The CPU 11 extracts a road name corresponding to a link existing within a given distance. The CPU 11 stores the extracted road name in the road information field of the facility DB 154.

FIG. 32 is an explanatory drawing illustrating an example of a record layout of the dictionary DB 157 according to Embodiment 7. The dictionary DB 157 is further provided with a road unit ID field and a road information field, the road information field including a road name field. Though the road information includes an identification number for identifying a road name, such an identification number will not be described here to facilitate explanation. The road information is used not as an attribute as described in Embodiment 5 but as a new search key.

Figure 33:
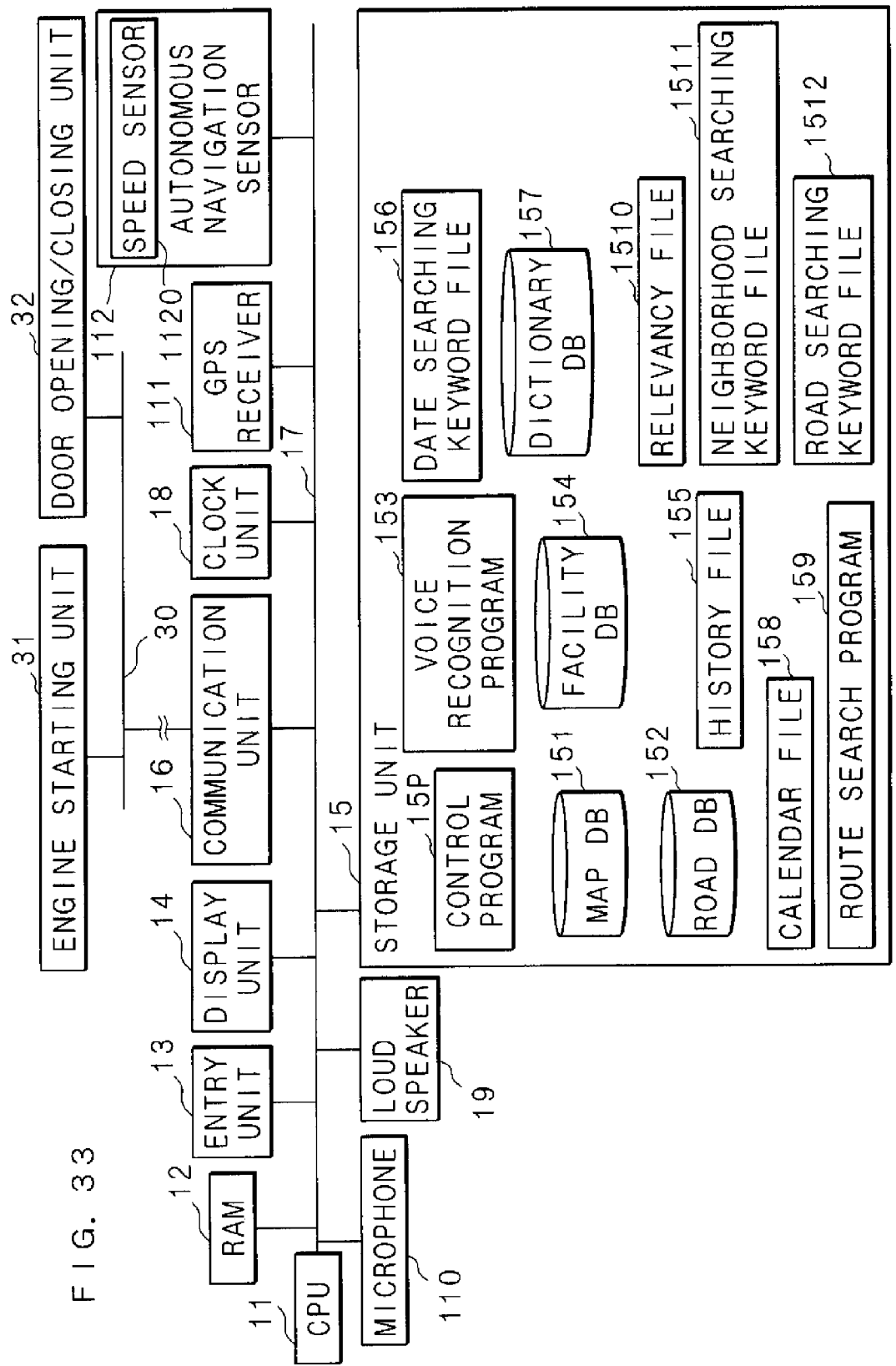
FIG. 33 is a block diagram illustrating an example of a hardware group of a car navigation device according to Embodiment 7.

Stored in the road name field is a road name existing near a facility name. Stored in the road unit ID field is an ID for identifying a road searching keyword including words concerning a plurality of roads, as in the date unit 100. FIG. 33 is a block diagram illustrating an example of a hardware group of the car navigation device 1 according to Embodiment 7. The storage unit 15 is further provided with a road searching keyword file 1512.

FIG. 34 is an explanatory drawing illustrating an example of a record layout of the road searching keyword file 1512. The road searching keyword file 1512 includes a road unit ID field, a road name field and a road searching keyword field. Stored in the road unit ID field is a unique identification number for identifying a road searching keyword including a word concerning a road name. In the road name field, road names such as "Route 43," "Express Highway X," "Bypass Y" and the like are stored. For the road searching keyword, a plurality of road searching keywords including a word concerning a road name are stored as voice data for voice recognition. For example, if the road name is Route 43, a plurality of road searching keywords such as "in front of National Route 43," "on Route 43," "in front of Route 43" and the like are stored in addition to "Route 43."

A set of the plurality of road searching keywords is hereinafter referred to as a road unit 160. As with the date unit 100 and the facility unit 200, one of the plurality of road searching keywords stored in the road unit 160 may be used for matching. The road searching keyword includes a road name and a prepositional term such as "along," "in front of," "across from," "near," "beside" or the like. For the word corresponding to a road name in the road searching keyword, a plurality of word patterns concerning road information may be pre-stored. For example, since the user may voice-enter "Express Highway X" as "Highway X," a plurality of possible names derived from a formal road name may be stored. In addition, "Express Highway X" may also be stored as "Highway Road X," just "X," or the like. Such road searching keywords are pre-stored in the road searching keyword file 1512 for each road.

FIG. 35 is an explanatory drawing illustrating an example of a grammar generated one day later. In addition to the example described in Embodiment 1, the road unit 160 is inserted between the date unit 100 and the facility unit 200. The CPU 11 reads out a road unit ID stored in the dictionary DB 157 to read out a road searching keyword corresponding to the road unit ID from the road searching keyword file 1512. In the example illustrated in FIG. 35, a group of road searching keywords given to "Route 43" is indicated as the road unit 160. In this case, if the user enters by voice "restaurant," "along Route 43" and "I went this month," the CPU 11 refers to the dictionary DB 157 to extract the search ID "0701001" for which the units are linked with one another from the beginning state to the ending state. Though an example is described wherein the road searching keyword is a combination of a facility name and a prepositional term, it is not limited thereto. The road searching keyword may include a road name and a common or another name of the road name while a prepositional term is stored in a different unit. In such a case, a plurality of prepositional terms are stored in the dictionary DB 157 for a prepositional term searching keyword.

Figure 36A:
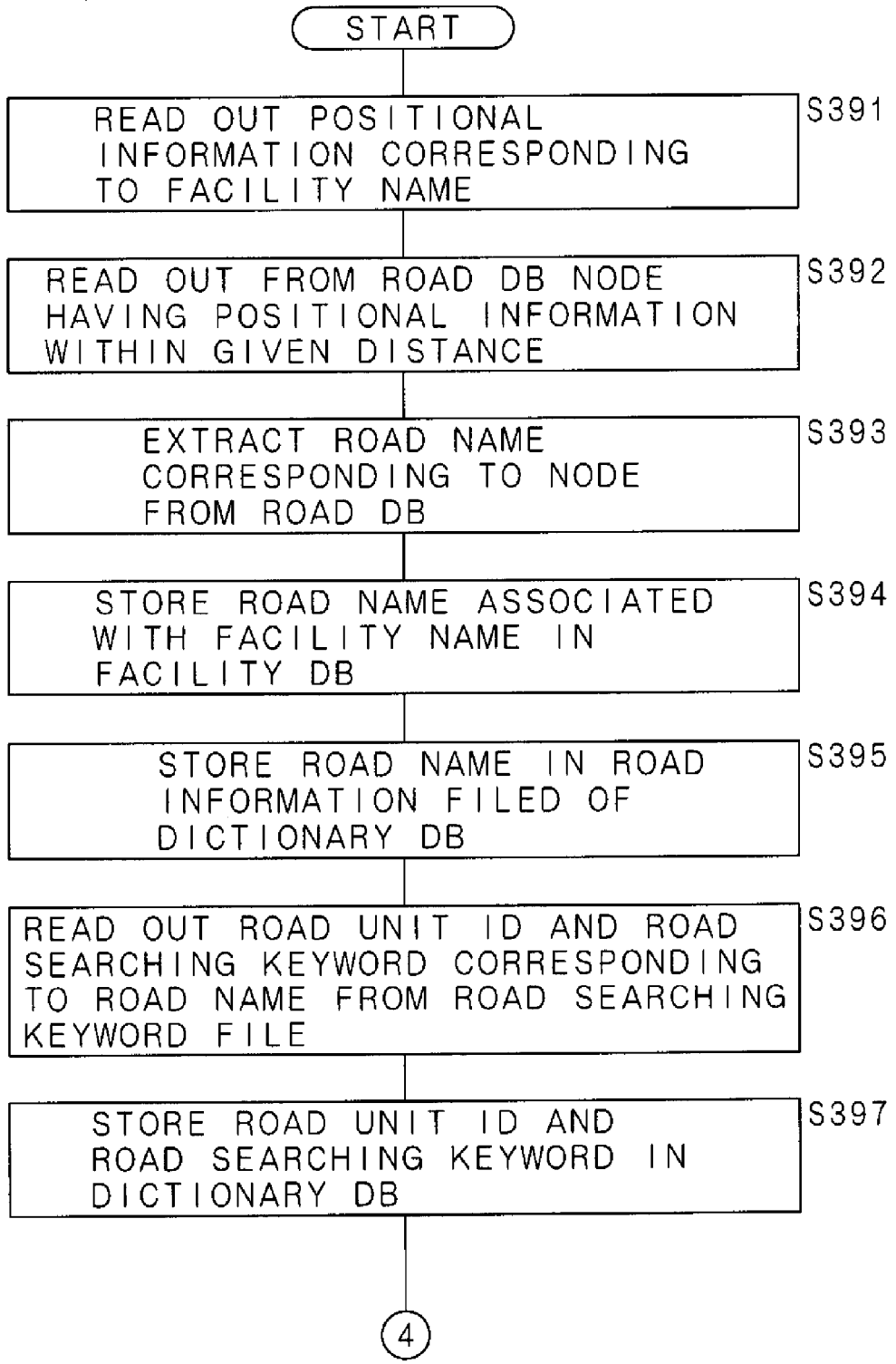
FIGS. 36A and 36B are operation charts illustrating an example of the procedure of an extraction process for road information and an extraction process for a search ID.
Figure 36B:
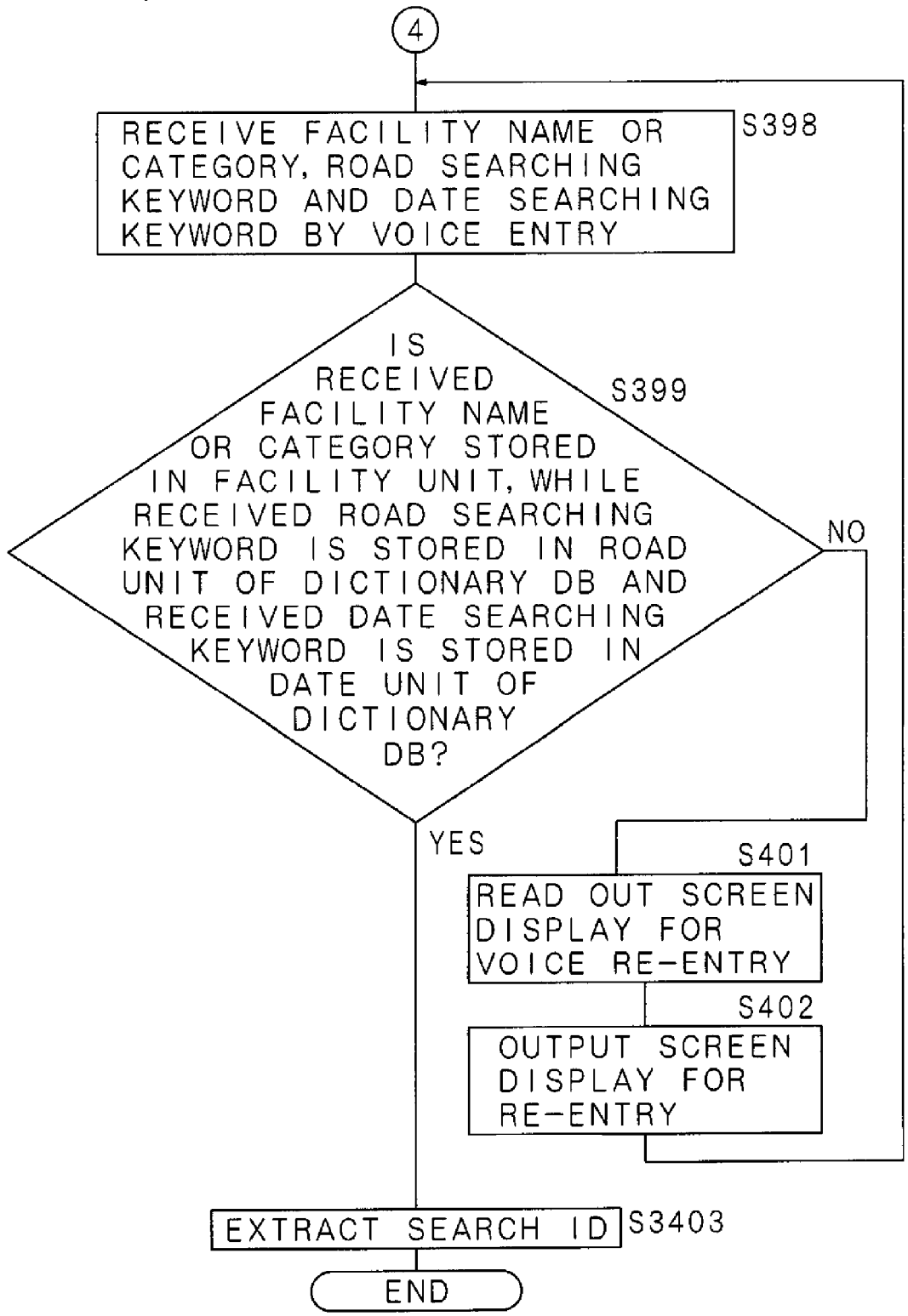

FIGS. 36A and 36B are operation charts illustrating examples of the procedure of an extraction process for road information and an extraction process for a search ID. First, the procedure of a process for extracting a neighborhood road name is described. The CPU 11 reads out positional information corresponding to a target facility name (at Operation S391). The CPU 11 reads out a node having the positional information existing within a range of a given distance from the positional information read out from the road DB 152 (at Operation S392). The CPU 11 extracts a road name corresponding to the read-out node from the road DB 152 (at Operation S393). The CPU 11 stores the extracted road name in the facility DB 154 by associating it with the facility name (at Operation S394).

Next, the processes executed after the Operation S104 in Embodiment 1 are described. The CPU 11 stores a road name extracted at the Operation S393 in the road information field of the dictionary DB 157 (at Operation S395). The CPU 11 reads out a road unit ID and a road searching keyword that correspond to the road name from the road searching keyword file 1512 (at Operation S396). The CPU 11 stores in the dictionary DB 157 the read-out road unit ID and the road searching keyword that is voice data (at Operation S397). Accordingly, the road unit 160 including a group of road searching keywords concerning road information is stored in the dictionary DB 157.

After the process of changing a date searching keyword performed for the dictionary DB 157, the CPU 11 receives the voice data entered from the microphone 110 including a facility name or a category, a road searching keyword and a date searching keyword (at Operation S398). The CPU 11 determines if the received facility name or category is stored in the facility unit 200 as voice data, if the received road searching keyword is stored in the road unit 160 of the dictionary DB 157 and if the received date searching keyword for the received voice data is stored in the date unit 100 of the dictionary DB 157 (at Operation S399).

If the CPU 11 determines that these three factors are not stored in the above-described order under the AND condition (NO at Operation S399), it reads out a screen display from the storage unit 15, urging the user to re-enter the voice (at Operation S401). The CPU 11 outputs the read-out screen display, urging the user to re-enter, to the display unit 14 (at Operation S402). The CPU 11 returns the process back to S398. If the CPU 11 determines that the facility name or category, the road searching keyword and the date searching keyword are stored in this order under the AND condition (YES at Operation S399), it extracts a corresponding search ID (at Operation S3403). The subsequent processes are similar to those from the Operation S123 on in Embodiment 1, which will not be described here in detail. According to the present embodiment, searching accuracy may be improved despite of the user's vague memory by utilizing memorable road information as a search key.

Since Embodiment 7 includes a structure as described above while the other structures are similar to those of Embodiments 1 to 6, corresponding parts are provided with the same reference numbers and will not be described here in detail.

Embodiment 8

Embodiment 8 relates to an extraction process in consideration of weight. FIG. 37 is an explanatory drawing illustrating an example of a record layout of the dictionary DB 157 according to Embodiment 8. The dictionary DB 157 is further provided with a weight field and an extraction date field. In the extraction date field, a date that is output from the clock unit 18, when a search ID is extracted at the Operation S122 as a result of voice recognition, is stored at the instruction of the CPU 11. For example, the fact that the grammar indicated by the search ID "0701001" is extracted on Jul. 22, 2008 is stored in the extraction date field. An example wherein a weight and an extraction date are stored in the dictionary DB 157 is described to facilitate explanation, it is not limited thereto. For example, a weight and an extraction date may be stored in a different file in the storage unit 15 by associating them with a search ID.

A weight is utilized in voice recognition or when a plurality of search IDs are extracted as described in Embodiment 2. The former is described. The CPU 11 performs a voice recognition process by referring to an acoustic model and a language model to convert the entered voice to a word line having the maximum likelihood. The likelihood of a word line is calculated as a product obtained by multiplying (adding in the log domain) a matching likelihood (or acoustic likelihood) between the word line and the entered voice by a word line likelihood (or language likelihood) based on the language model. In the voice recognition performed at the Operation S118 or the like, a weight stored in the dictionary DB 157 is added to a likelihood of a grammar including a word line stored in the dictionary DB 157. This means that the one having a larger weight is given priority for extraction.

Here, a weight falls in the log-likelihood domain, the value thereof being larger than 0 and equal to or smaller than 1.

The latter is described. If a plurality of search IDs exist as a result of extraction, they may be sorted by weight such that a given number of search IDs with larger weight may be given higher priority for extraction. Otherwise, all search IDs may be output to the display unit 14 in the sorted order. An example is described below wherein a given number of search IDs with larger weight are extracted if a plurality of corresponding search IDs exist. In calculating weight, the CPU 11 refers to a facility ID in the dictionary DB 157 to count the number of the same facility IDs. The CPU 11 then gives a weight based on the counted number. For example, when the same facility ID is stored thirty times, the CPU 11 multiplies the number of times by an appropriate coefficient, e.g. 0.01, so as to calculate a weight, e.g. 0.3. Accordingly, the facility information that is frequently searched for or the facility information that is frequently stopped by is able to receive a higher priority at extraction. An example is described below wherein the counted number of times corresponds to a weight.

Moreover, the CPU 11, by referring to the dictionary DB 157, gives a small weight when an acquisition date flag is set whereas it gives a large weight when no acquisition date flag is set. For example, the CPU 11 gives a large weight of 0.5 to the weight 30, i.e. the above-described number of times, or multiplies the number by a large coefficient of 0.15, when no acquisition date flag is set. The CPU 11, on the other hand, gives a small weight of 0.3 to the weight 30, i.e. the above-described number of times, or multiplies the number by a small coefficient of 0.11, when an acquisition date flag is set. This may be performed because the facility information actively acquired by a search is considered to have a higher possibility of another search, compared to the facility information acquired when the user stopped by at the facility. In the present embodiment, an example is described wherein the first weight is added when no acquisition date flag is set, while the second weight which is smaller than the first weight is added when an acquisition date flag is set.

In addition, the CPU 11 may count the number of times a search ID is extracted by the process at the Operation S122 or the like, so as to give a weight based on the counted number of times. Specifically, the CPU 11 may set a value based on the number of extraction dates stored in the extraction date field as a weight. This allows facility information for a frequently-extracted search ID to be given higher priority for extraction. In the following description, though an example is described wherein all the above-described weights are given, it may also be possible to give a weight obtained by one of the methods.

Figure 38A:
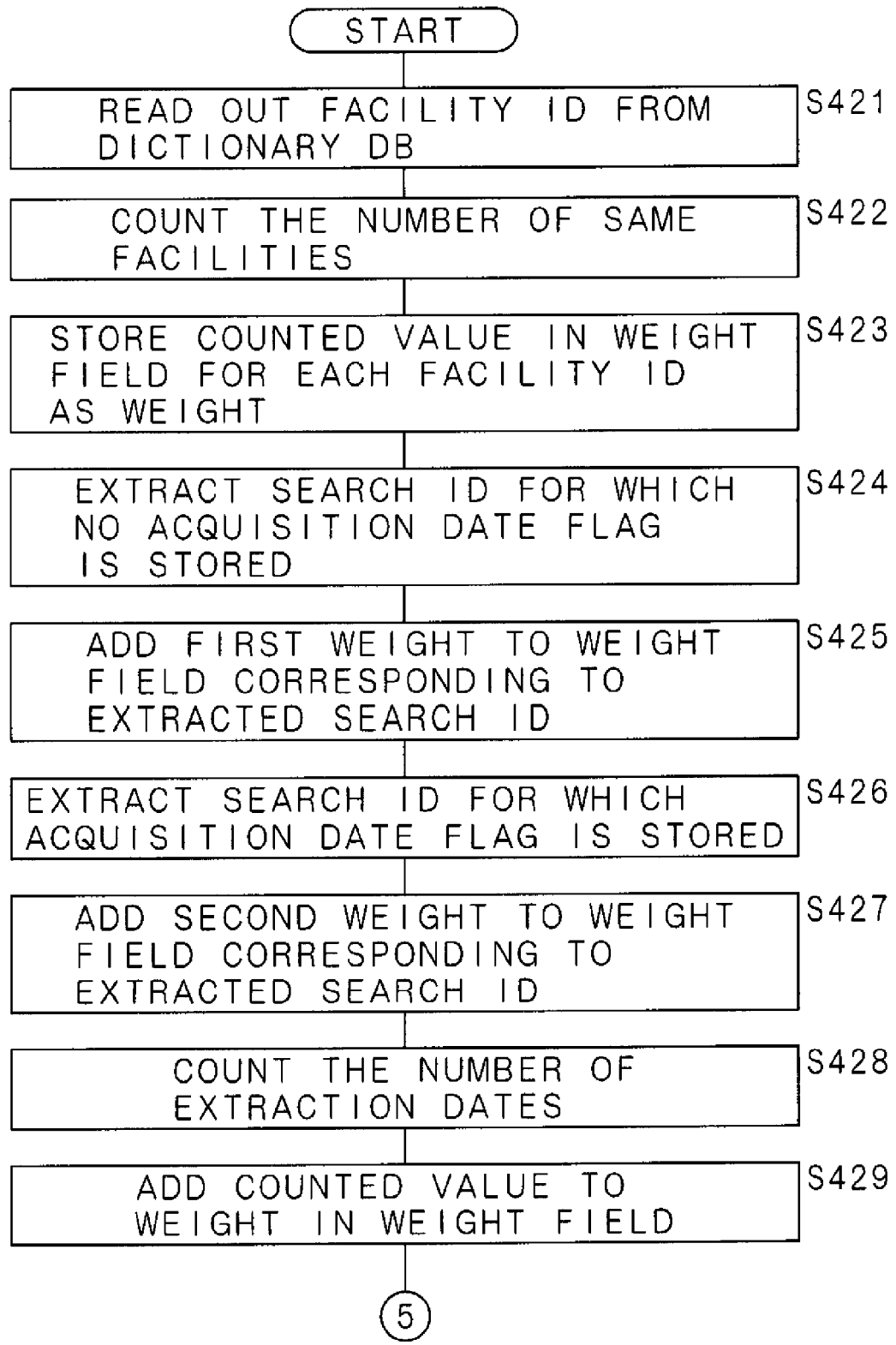
FIGS. 38A and 38B are operation charts illustrating an example of the procedure of a weight deciding process and a weight extracting process.
Figure 38B:
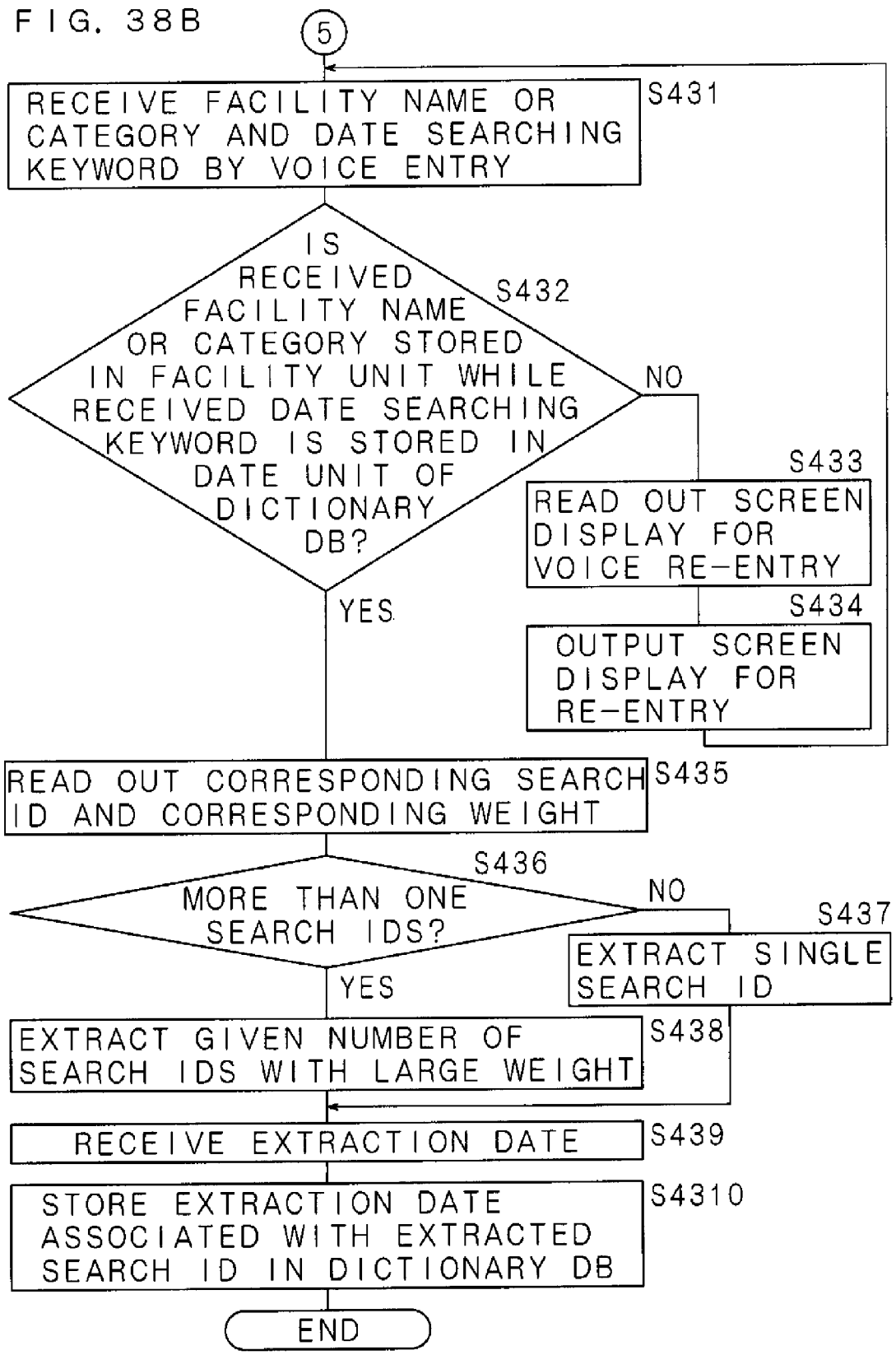

FIGS. 38A and 38B are operation charts illustrating examples of the procedure of a weight deciding process and a weight extracting process. The CPU 11 reads out a facility ID from the dictionary DB 157 (at Operation S421). The CPU 11 counts the number of facilities having the same facility ID as the read-out facility ID (at Operation S422). The CPU 11 stores the counted value, as a weight, in the weight field for each facility ID read out at the Operation S421 (at Operation S423). Subsequently, the CPU 11 extracts from the dictionary DB 157 a search ID for which no acquisition flag is stored (at Operation S424). The CPU 11 adds the first weight pre-stored in the storage unit 15 to a weight field corresponding to the extracted search ID (at Operation S425).

The CPU 11 extracts from the dictionary DB 157 a search ID for which an acquisition date flag is stored (at Operation S426). The CPU 11 adds the second weight pre-stored in the storage unit 15 to a weight field corresponding to the extracted search ID (at Operation S427). The CPU 11 refers to the extraction date field in the dictionary DB 157 to count the number of stored extraction dates for each search ID (at Operation S428). The CPU 11 adds the counted value to a weight field associated with a corresponding search ID (at Operation S429).

The CPU 11 receives the voice data entered from the microphone 110 including a facility name or a category and a date searching keyword (at Operation S431). The CPU 11 determines if the facility name or category is stored in the facility unit 200 as voice data and if the date searching keyword for the received voice data is stored in the date unit 100 of the dictionary DB 157 (at Operation S432). If the CPU 11 determines that these are not stored in the above-described order under the AND condition (NO at Operation S432), it reads out a screen display from the storage unit 15, urging the user to re-enter the voice (at Operation S433). The CPU 11 outputs the read-out screen display urging re-entry to the display unit 14 (at Operation S434). The CPU 11 returns the process back to S431.

If the CPU 11 determines that the facility name or category and the date searching keyword are stored in this order under the AND condition (YES at Operation S432), it reads out a corresponding search ID and a corresponding weight from the dictionary DB 157 (at Operation S435), and stores them in the RAM 12. The CPU 11 determines if the number of search IDs stored in the RAM 12 is more than one (at Operation S436). If the CPU 11 determines that the number is not more than one (NO at Operation S436), it extracts only a single search ID (at Operation S437) and moves the process on to the Operation S439.

If, on the other hand, the CPU 11 determines that the number of stored search IDs is more than one (YES at Operation S436), it extracts a given number of search IDs with large weight from the RAM 12 (at Operation S438). The given number, e.g. 5, is pre-stored in the storage unit 15, for which the user may enter an appropriate value from the entry unit 13. The CPU 11 receives a date output from the clock unit 18 (at Operation S439). The CPU 11 stores an extraction date in the dictionary DB 157 by associating the date with the plurality of search IDs extracted at the at Operation S438 or the search ID extracted at the Operation S437 (at Operation S4310).

Since Embodiment 8 includes a structure as described above while the other structures are similar to those of Embodiments 1 to 7, corresponding parts are provided with the same reference numbers and will not be described here in detail.

Embodiment 9

Embodiment 9 relates to a configuration wherein a record of old facility information and a record of well-acquainted facility information are deleted from the record of facility information in the dictionary DB 157. The CPU 11 calculates an elapsed time based on a search date stored in the dictionary DB 157 and a date output from the clock unit 18. When the elapsed time corresponds to a pre-stored given time or more, e.g. three years or more, the CPU 11 deletes a record for the facility name corresponding thereto.

Moreover, when a given value, e.g. 20, or more of the same facility information acquired by Embodiment 4 are stored in the dictionary DB 157, the corresponding record is deleted. Accordingly, places such as the user's own residence, the place of work, the point where the user regularly visits and the like, which are acquired as facility information by a halt for a given time or longer, are deleted after being stored a certain number of times. Accordingly, unnecessary factors in voice recognition may be eliminated.

Figure 39:
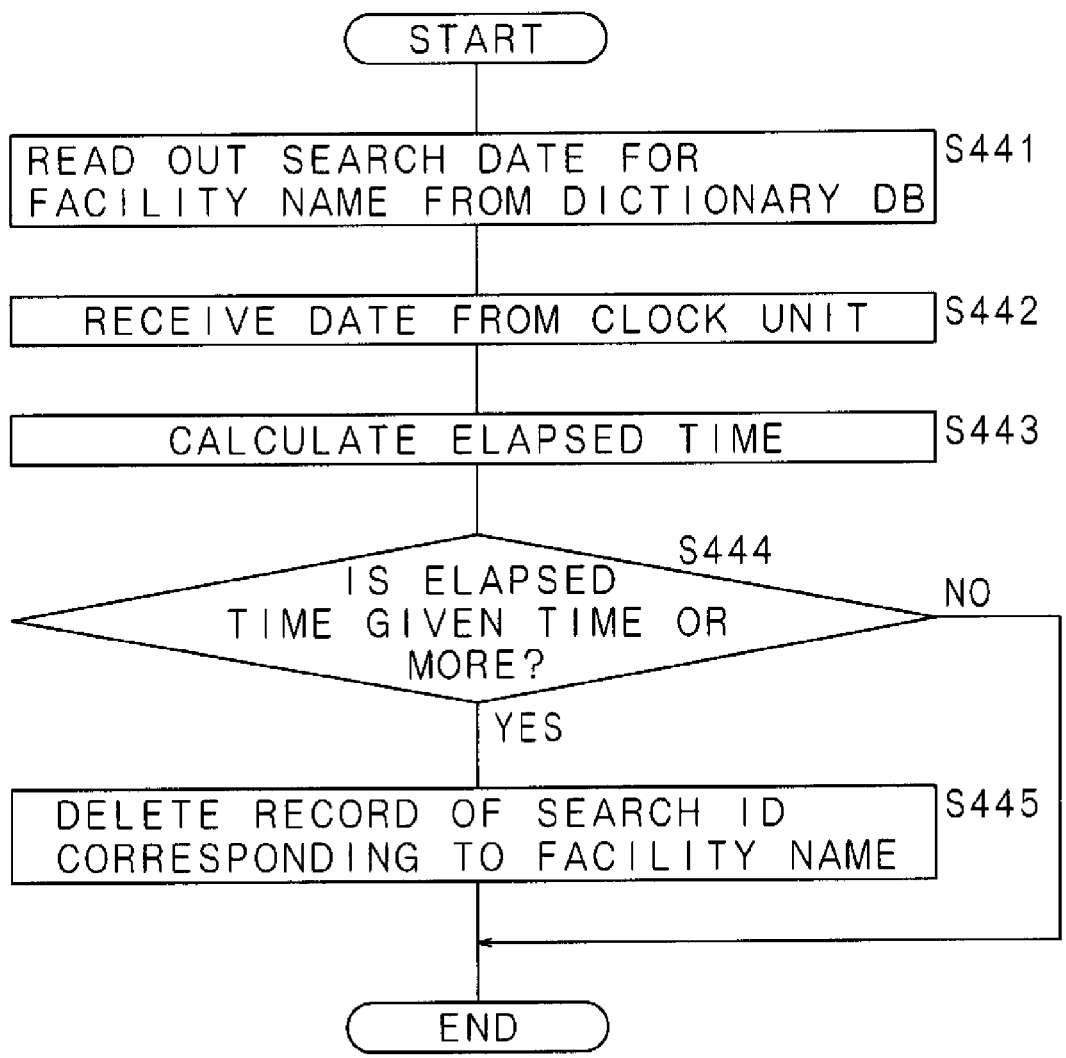
FIG. 39 is an operation chart illustrating an example of the procedure of an erasing process based on an elapsed time.

FIG. 39 is an operation chart illustrating an example of the procedure of an erasing process based on an elapsed time. The CPU 11 reads out a search date for a target facility name from the dictionary DB 157 (at Operation S441). The search date includes the acquisition date described in Embodiment 4. The CPU 11 receives date information from the clock 18 (at Operation S442). The CPU 11 calculates an elapsed time by subtracting the search date from the date received from the clock unit 18 (at Operation S443). The CPU 11 determines if the calculated elapsed time corresponds to a given time that is pre-stored in the storage unit 15 or more (at Operation S444). If the CPU 11 determines that it is not a given time or more (NO at Operation S444), it terminates the process because the target facility does not have an old search ID. If, on the other hand, the CPU 11 determines that the elapsed time corresponds to a given time or more (YES at Operation S444), it deletes the record of a search ID corresponding to the target facility name, which is determined as an old search ID (at Operation S445).

Figure 40:
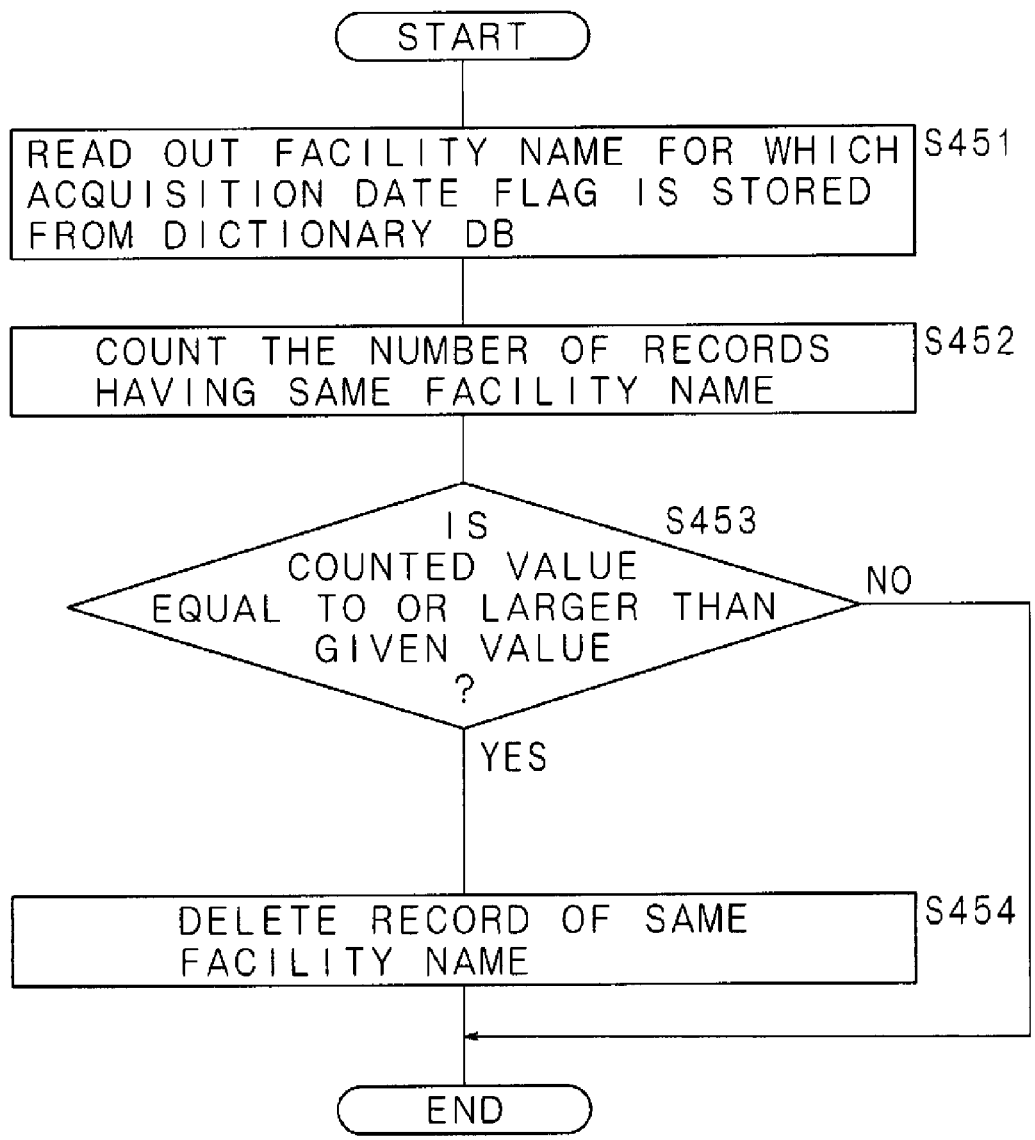
FIG. 40 is an operation chart illustrating an example of the procedure of an erasing process based on the number of acquisitions.

FIG. 40 is an operation chart illustrating an example of the procedure of an erasing process based on the number of acquisitions. The CPU 11 reads out from the dictionary DB 157 the facility name for which an acquisition date flag is stored (at Operation S451). The CPU 11 refers to the read-out facility name to count the number of records having the same facility name (at Operation S452). The CPU 11 determines if the counted value is equal to or larger than a given value, e.g. 5, pre-stored in the storage unit 15 (at Operation S453). If the CPU 11 determines that it is not equal to or larger than a given value (NO at Operation S453), it terminates the process. If the CPU 11, on the other hand, determines that the value is equal to or larger than a given value (YES at Operation S453), it deletes the record for the same facility name from the dictionary DB 157 (at Operation S454).

Since Embodiment 9 includes a structure as described above while the other structures are similar to those of Embodiments 1 to 8, corresponding parts are provided with the same reference numbers and will not be described here in detail.

Embodiment 10

Figure 41:
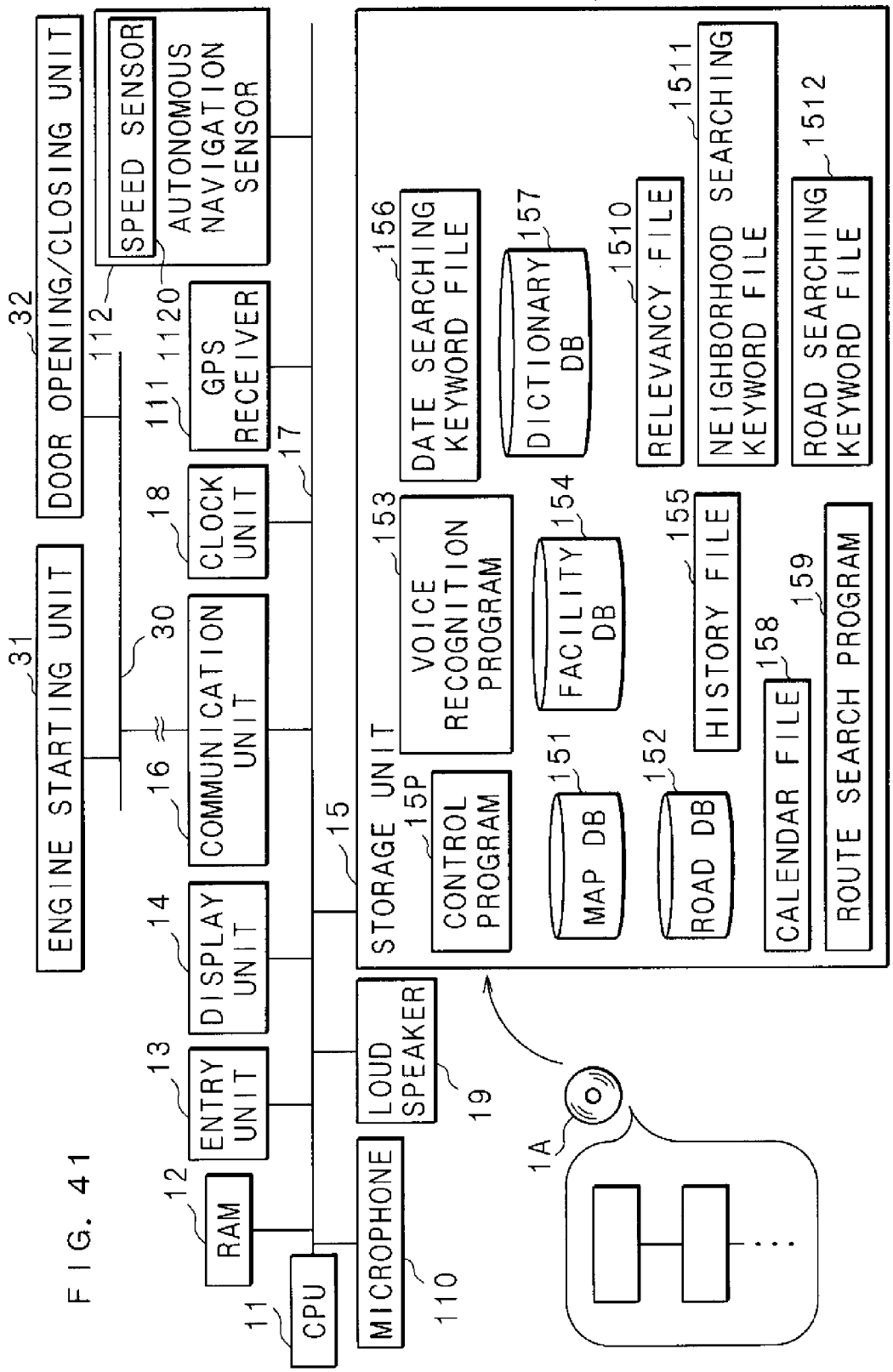
FIG. 41 is a block diagram illustrating an example of a car navigation device according to Embodiment 10.

FIG. 41 is a block diagram illustrating an example of the car navigation device 1 according to Embodiment 10. A program for making the car navigation device 1 according to the Embodiments 1 to 10 operate may be stored in the storage unit 15 by a recording medium reading device (not illustrated) reading a recording medium 1A such as a CD-ROM, a Universal Serial Bus (USB) memory or the like, as in the present Embodiment 10. Moreover, the program may be downloaded from another computer (not illustrated) connected via the communication network N. This will be described below.

The car navigation device 1 illustrated in FIG. 41 reads a program for, e.g., storing a search target and a search date, from a recording medium 1A. Otherwise, the car navigation device downloads the program from another computer (not illustrated) via a communication module (not illustrated) connected to the car navigation device 1. The program is installed as a control program 15P in the storage unit 15 and loaded to the RAM 12 for execution. This enables the car navigation device 1 to properly function as described above.

Since Embodiment 10 includes a structure as described above while the other structures are similar to those of Embodiments 1 to 9, corresponding parts are provided with the same reference numbers and will not be described here in detail.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A searching device for searching information, comprising:
 a history storing unit of a processor, storing information of a search target obtained by a search and a search date in a storage unit;
 a relevancy storing unit storing in said storage unit a previous searching keyword including a plurality of date-related words as well as said search target and an attribute of the search target in association with one another;
 a change unit changing the previous searching keyword stored in said storage unit, based on the search date stored in said storage unit and a date output from a clock unit;
 a reception unit receiving a previous searching keyword and said search target or the attribute that are entered by voice; an extraction unit extracting a search target corresponding to the previous searching keyword and the search target or attribute received by said reception unit, by referring to the previous searching keyword that is obtained after changing by said change unit, the search target and the attribute that are stored in said storage; and
 a search date output unit outputting a search date for each search target stored in said storage unit, when a plurality of search targets are extracted by said extraction unit.

2. The searching device according to claim 1, wherein said change unit includes
 an output unit outputting time passage information concerning a time elapsed from said search date, which is decided based on a search date stored in said storage unit and a date output from said clock unit,
 a previous searching keyword storing unit storing in said storage unit a plurality of previous searching keywords associated with the time passage information,
 a reading-out unit reading out from said storage unit a previous searching keyword corresponding to the time passage information output by said output unit, and
 a keyword change unit changing the previous searching keyword stored in said storage unit to the previous searching keyword read out by said reading-out unit.

3. The searching device according to claim 1, further comprising an attribute output unit outputting a search date and an attribute for each search target stored in said storage unit, when a plurality of search targets are extracted by said extraction unit.

4. The searching device according to claim 1, wherein said change unit includes
 an output unit outputting time passage information concerning a time elapsed from said search date, which is decided based on a search date stored in said storage unit and a date output from said clock unit, a previous searching keyword storing unit storing in said storage unit a plurality of previous search keywords associated with the time passage information, a relevancy file in which a relevant different date-related word is stored associated with the time passage information and the search date, a reading-out unit reading out the relevant different date-related word from said relevancy file based on the time passage information output by said output unit and the search date stored in said storage unit, an addition unit adding the different date-related word read out by the reading-out unit to the time passage information output by said output unit, a previous searching keyword reading-out unit reading out from said storage unit a previous searching keyword corresponding to the time passage information to which the different date-related word is added by the addition unit, and a keyword change unit changing the previous searching keyword stored in said storage unit to the previous searching keyword read out by said previous searching keyword reading-out unit.

5. The searching device according to claim 1, further comprising:

a positional information acquisition unit acquiring positional information on a point at which the searching device halted for a given time or longer; and a facility information reading-out unit reading out facility information corresponding to the positional information, acquired by said positional information acquisition unit, from a facility database in which facility information, which is said search target, and the positional information are stored, wherein said history storing unit stores in said storage unit facility information and a search date obtained by a search, as well as the facility information read out by said facility information reading-out unit, and an acquisition date on which the positional information is acquired by said positional information acquisition unit.

6. The searching device according to claim 5, further comprising a neighborhood extraction unit extracting, from said facility database, neighborhood facility information existing near facility information, wherein said relevancy storing unit stores in said storage unit a previous searching keyword including a plurality of date-related words as well as said facility information and the neighborhood facility information extracted by said neighborhood extraction unit as an attribute, in association with one another.

7. The searching device according to claim 5, further comprising a neighborhood extraction unit extracting, from said facility database, neighborhood facility information existing near facility information, wherein said relevancy storing unit stores in said storage unit a previous searching keyword including a plurality of date-related words and a neighborhood searching keyword including a word concerning the neighborhood facility information extracted by said neighborhood extraction unit, as well as said facility information and attribute in association with one another, said reception unit receives a previous searching keyword, a neighborhood searching keyword and said facility information or attribute that are entered by voice, and said extraction unit extracts facility information corresponding to the previous searching keyword, the neighborhood searching keyword and the facility information or attribute received by said reception unit, by referring to the previous searching keyword that is obtained after changing by said change unit, the neighborhood searching keyword, the facility information and attribute that are stored in said storage unit.

8. The searching device according to claim 5, further comprising a road extraction unit extracting road information existing near facility information from a road database in which the road information is stored, wherein said relevancy storing unit stores in said storage unit a previous searching keyword including a plurality of date-related words and a road searching keyword including a word concerning the road information extracted by said road extraction unit, as well as said facility information and attribute, in association with one another, said reception unit receives a previous searching keyword, a road searching keyword and said facility information or attribute that are entered by voice, and said extraction unit extracts facility information corresponding to the previous searching keyword, the road searching keyword and the facility information or attribute received by said reception unit, by referring to the previous searching keyword that is obtained after changing by said change unit, the road searching keyword, the facility information and attribute that are stored in said storage unit.

9. The searching device according to claim 5, further comprising:

a count unit counting the number of the same facility information as facility information stored in said storage unit by said history storing unit; and a weight storage unit storing a weight based on the number counted by the count unit, by associating the weight with facility information, wherein said extraction unit extracts facility information corresponding to the previous searching keyword and the facility information or attribute received by said reception unit, by referring to the previous searching keyword that is obtained after changing by said change unit, the facility information and the attribute that are stored in said storage unit, as well as said weight associated with the facility information stored by said weight storage unit.

10. The searching device according to claim 5, further comprising a weight storage unit storing a weight for facility information obtained by a search and a weight for facility information read out by said facility information reading-out unit, which has a value smaller than the weight obtained by a search, wherein said extraction unit extracts facility information corresponding to the previous searching keyword and the facility information or attribute that are received by said reception unit, by referring to the previous searching keyword that is obtained after changing by said change unit, the facility information and the attribute that are stored in said storage unit, as well as said weight associated with the said facility information stored by said weight storage unit.

11. The searching device according to claim 9, further comprising an extraction number counting unit counting the number of extraction times facility information is extracted by said extraction unit, wherein said weight storage unit stores, in association with facility information, a weight based on the number counted by said count unit and the extraction number counted by said extraction number counting unit.

12. The searching device according to claim 11, further comprising:
- an elapsed time output unit outputting an elapsed time based on a search date or an acquisition date corresponding to facility information stored in said storage unit and a date output from said clock unit; and
- a delete unit deleting said facility information stored in said storage unit when the elapsed time output by the elapsed time output unit is a given time or more.

13. The searching device according to claim 12, further comprising:
- a read-out number counting unit counting the number of read-out times facility information is read out by said facility information reading-out unit; and
- a facility information delete unit deleting said facility information stored in said storage unit when the number of read-out times counted by the read-out number counting unit is equal to or larger than a given value.

14. A searching method for searching information using a searching device, comprising:
- storing in a storage unit information of a search target obtained by a search and a search date;
- storing in said storage unit a previous searching keyword including a plurality of date-related words as well as said search target and an attribute of the search target, in association with one another;
- changing the previous searching keyword stored in said storage unit based on the search date stored in said storage unit and a date output by a clock unit;
- receiving a previous searching keyword and said search target or the attribute that are entered by voice;
- extracting a search target corresponding to said previous searching keyword and said search target or attribute that are received by said receiving, by referring to the previous searching keyword that is obtained by said changing, the search target and the attribute that are stored in said storage unit; and
- outputting a search date for each search target stored in said storage unit, when a plurality of search targets are extracted by said extraction unit.

15. The searching method according to claim 14, wherein when said previous searching keyword is changed,
- time passage information concerning a time elapsed from said search date, which is decided based on a search date stored in said storage unit and a date output from said clock unit, is output,
- a plurality of previous searching keywords are stored in said storage unit in association with the time passage information,
- a previous searching keyword corresponding to the output time passage information is read out from said storage unit, and
- the previous searching keyword stored in said storage unit is changed to the read-out previous searching keyword.

16. The searching method according to claim 14, further comprising outputting a search date for each search target stored in said storage unit, when a plurality of search targets are extracted.

17. The searching method according to claim 14, further comprising outputting a search date and an attribute for each search target stored in said storage unit, when a plurality of search targets are extracted.

18. The searching method according to claim 14, wherein when said previous searching keyword is changed,
- time passage information concerning a time elapsed from said search date, decided based on a search date stored in said storage unit and a date output from said clock unit, is output,
- a plurality of previous searching keywords are stored in said storage unit, in association with the time passage information,
- a relevant different date-related word is read out from a relevancy file in which the relevant different date-related word is stored in association with time passage information and a search date, based on the output time passage information and the search date stored in said storage unit,
- the read-out different date-related word is added to the output time passage information,
- a previous searching keyword corresponding to the time passage information, to which the different date-related word is added, is read out from said storage unit, and
- the previous searching keyword stored in said storage unit is changed to the read-out previous searching keyword.

19. A recording medium capable of being read by a computer in which a program for making the computer execute an information search is recorded, said program comprising:
- storing in a storage unit information of a search target obtained by a search and a search date;
- storing in said storage unit a previous searching keyword including a plurality of date-related words as well as said search target and an attribute of the search target, in association with one another;
- changing the previous searching keyword stored in said storage unit, based on the search date stored in said storage unit and a date output from a clock unit;
- receiving a previous searching keyword and said search target or the attribute that are entered by voice;
- extracting a search target corresponding to the previous searching keyword and the search target or attribute that are received by said receiving, by referring to the previous searching keyword that is changed by said changing, the search target and the attribute that are stored in said storage unit; and
- outputting a search date for each search target stored in said storage unit, when a plurality of search targets are extracted by said extraction unit.

* * * * *